United States Patent
Takeyoshi et al.

(10) Patent No.: US 8,792,342 B2
(45) Date of Patent: Jul. 29, 2014

(54) BANDWIDTH GUARANTEEING APPARATUS AND BANDWIDTH GUARANTEEING METHOD

(75) Inventors: Haruyuki Takeyoshi, Kawasaki (JP); Akio Iwata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 123 days.

(21) Appl. No.: 13/432,121

(22) Filed: Mar. 28, 2012

(65) Prior Publication Data

US 2012/0300624 A1    Nov. 29, 2012

(30) Foreign Application Priority Data

May 25, 2011    (JP) ................................. 2011-116717

(51) Int. Cl.
*H04L 12/24* (2006.01)

(52) U.S. Cl.
USPC .......................... 370/230; 370/242; 370/401

(58) Field of Classification Search
USPC ........................................................ 370/230
See application file for complete search history.

(56) References Cited

U.S. PATENT DOCUMENTS

| | | | |
|---|---|---|---|
| 6,519,595 B1 * | 2/2003 | Rose .............................. 370/412 |
| 6,611,525 B1 * | 8/2003 | Natanson et al. ........ 370/395.53 |
| 6,981,074 B2 * | 12/2005 | Oner et al. ....................... 710/32 |
| 7,023,799 B2 * | 4/2006 | Takase et al. .............. 370/230.1 |
| 7,289,514 B2 * | 10/2007 | Robotham et al. ......... 370/395.4 |
| 7,362,749 B2 * | 4/2008 | Bishard .......................... 370/357 |
| 7,385,982 B2 * | 6/2008 | Warden et al. ................ 370/392 |
| 7,584,316 B2 * | 9/2009 | Oner ............................. 710/263 |
| 7,616,567 B2 * | 11/2009 | Shinagawa et al. ........... 370/231 |
| 7,911,951 B2 * | 3/2011 | Sasaki et al. .................. 370/233 |
| 8,000,235 B2 * | 8/2011 | Noy et al. ...................... 370/230 |
| 2004/0151170 A1 * | 8/2004 | Gulati et al. ................... 370/360 |
| 2007/0201375 A1 * | 8/2007 | Hallinan et al. .............. 370/252 |
| 2007/0237082 A1 * | 10/2007 | Han ................................ 370/235 |
| 2010/0135158 A1 * | 6/2010 | Adams .......................... 370/235 |
| 2012/0224851 A1 * | 9/2012 | Takara et al. ................... 398/45 |
| 2013/0201831 A1 * | 8/2013 | Tal et al. ........................ 370/235 |

FOREIGN PATENT DOCUMENTS

| | | | | |
|---|---|---|---|---|
| JP | 2002-051076 | * | 2/2002 | ............. H04L 12/56 |
| JP | 2002-051076 A | | 2/2002 | |
| JP | 2002-252636 A | | 9/2002 | |

OTHER PUBLICATIONS

ITU-T OAM functions and mechanisms for Ethernet based networks, Feb. 2008.

* cited by examiner

*Primary Examiner* — Ian N Moore
*Assistant Examiner* — Lakeram Jangbahadur
(74) *Attorney, Agent, or Firm* — Fujitsu Patent Center

(57) ABSTRACT

A bandwidth guaranteeing apparatus includes a controller that collects guaranteed communication rate for a plurality of devices on an OVC between a user-side apparatus and the bandwidth guaranteeing apparatus; and a determiner that obtains the smallest value of the guaranteed communication rate collected by the controller and upon a bandwidth change request that is for the OVC and from the user-side apparatus, determines whether the bandwidth change request can be accepted, based on the obtained guaranteed communication rate.

11 Claims, 25 Drawing Sheets

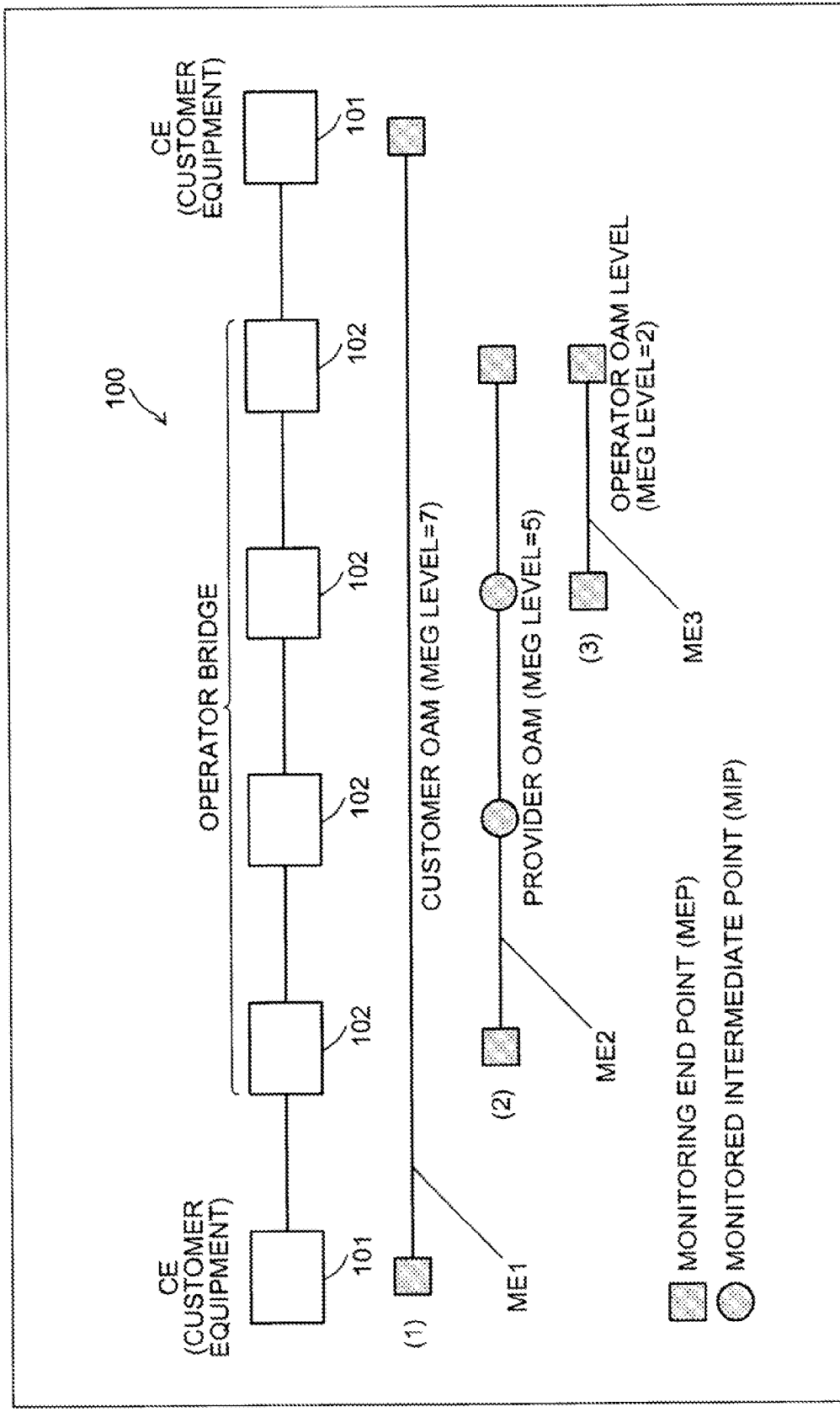

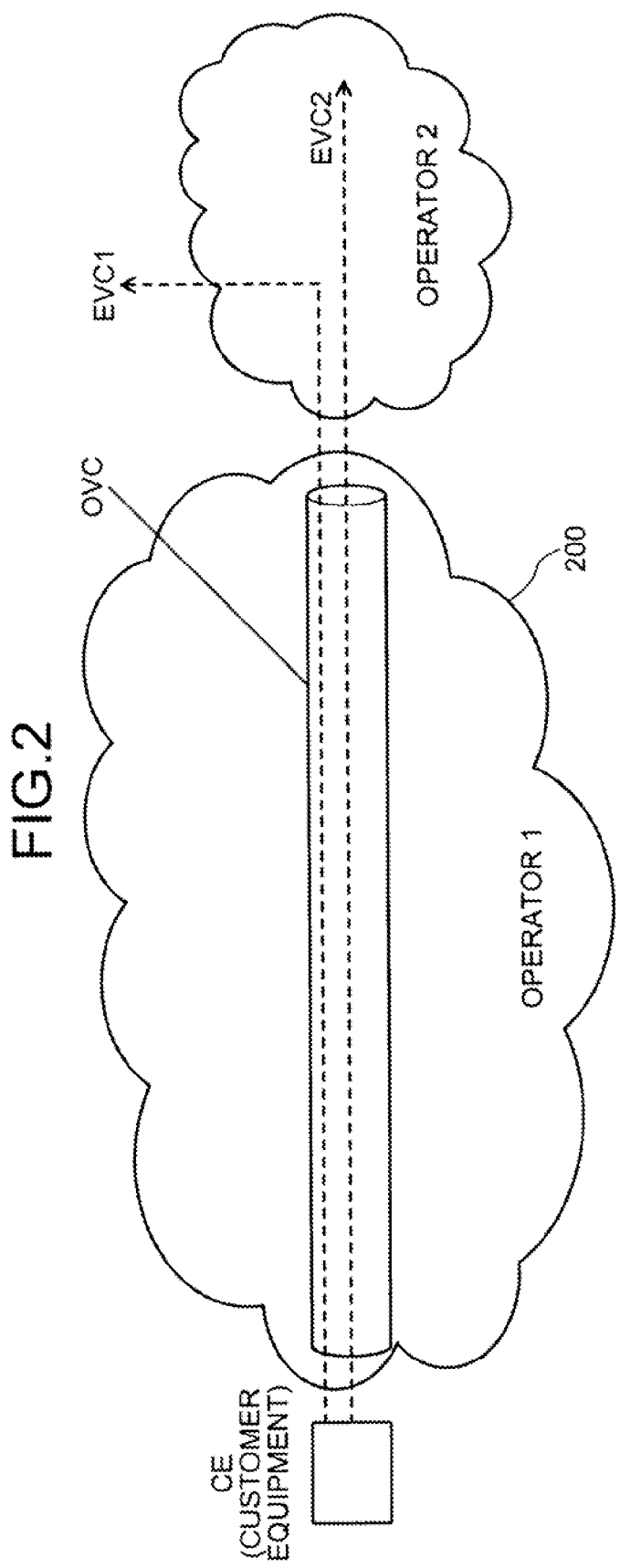

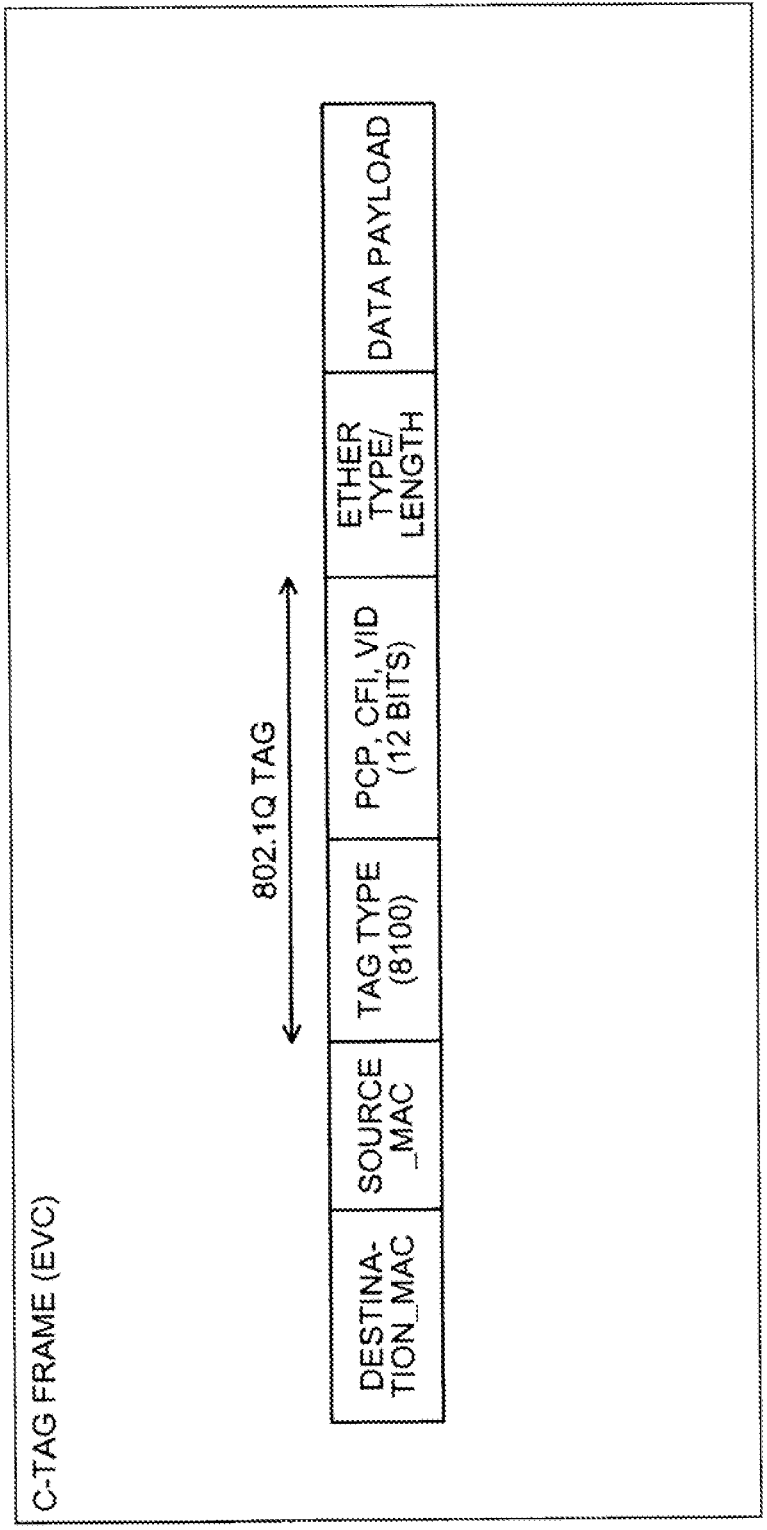

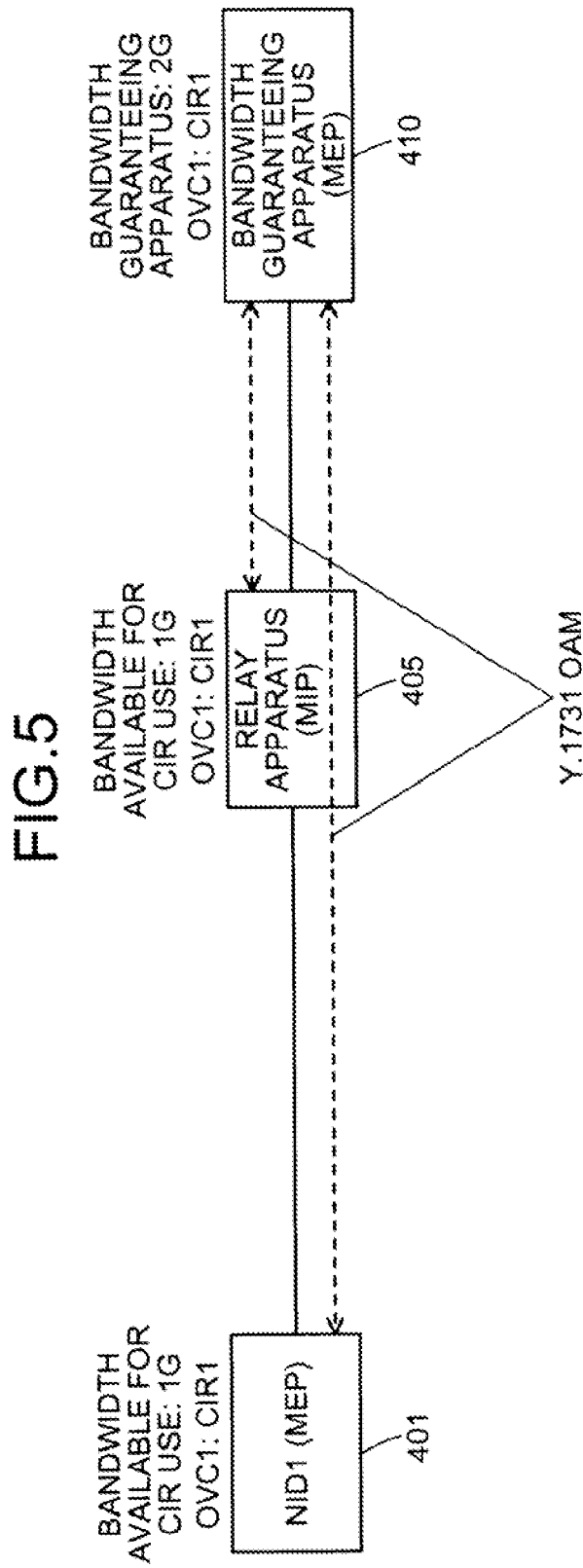

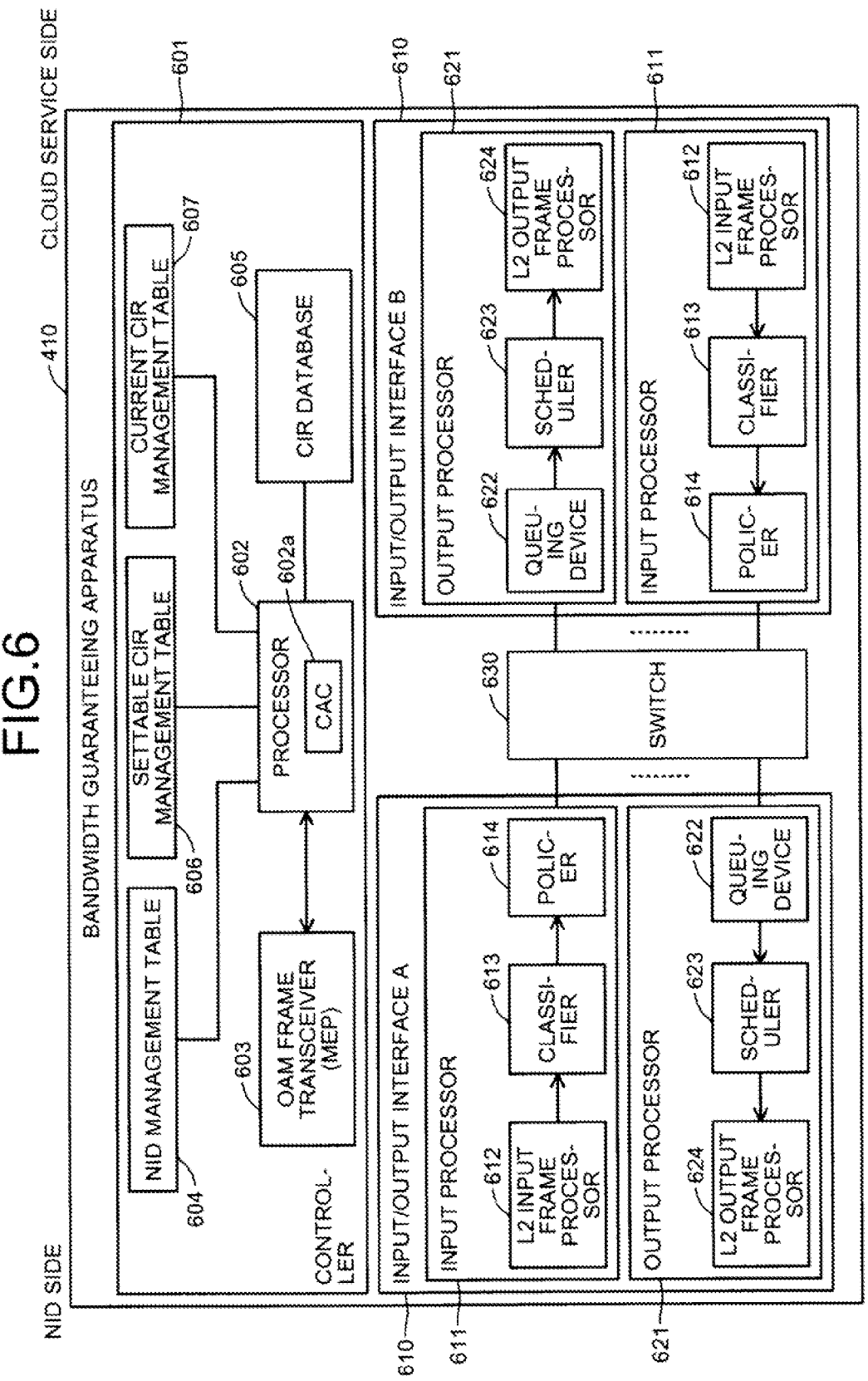

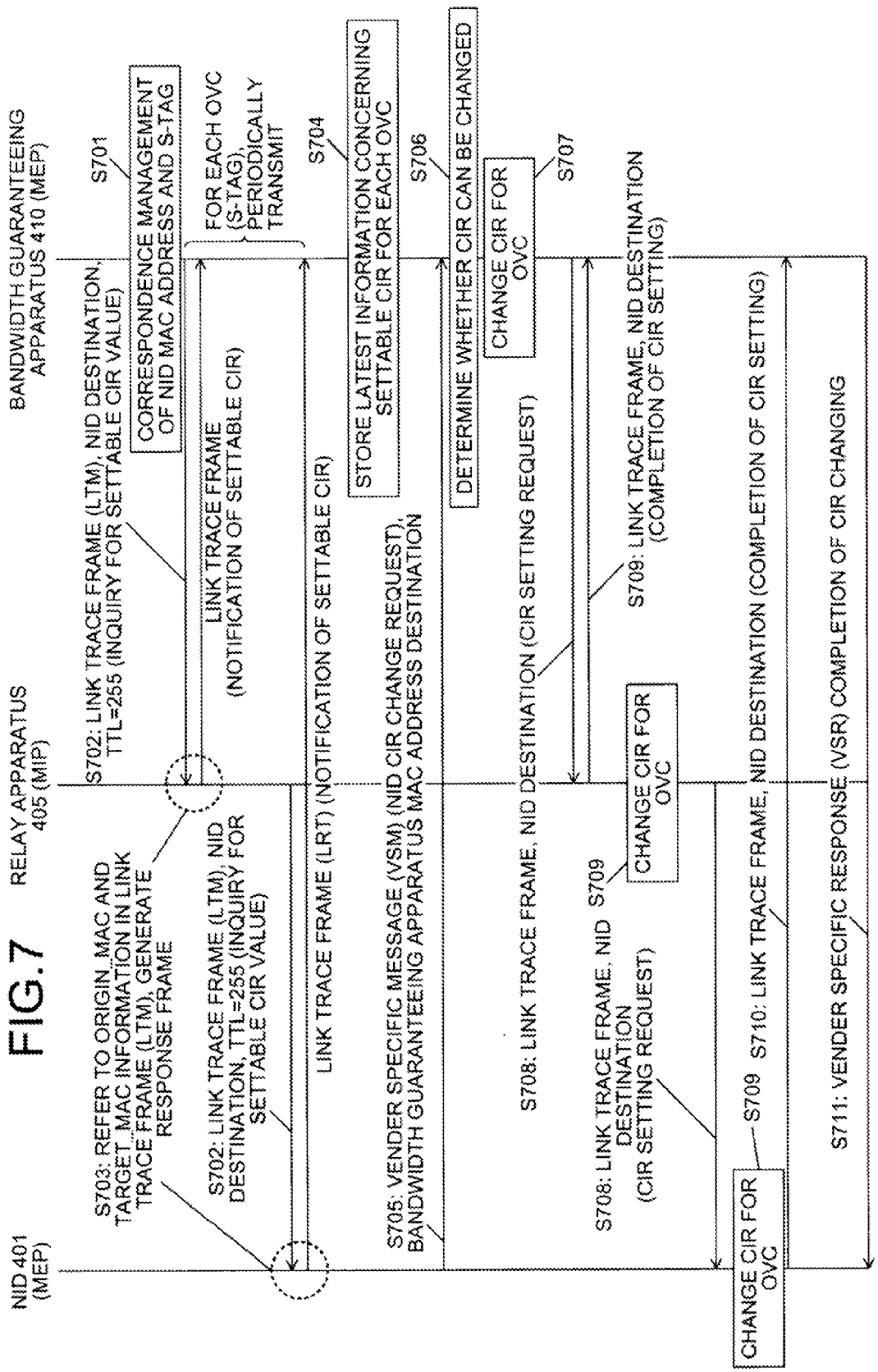

FIG. 8B

| S-TAG | TRANSACTION ID | LTR ORIGIN MAC ADDRESS | HOP COUNT FROM BANDWIDTH GUARANTEEING APPARATUS | SETTABLE CIR per CTR (M) |
|---|---|---|---|---|
| 111111000000 | 1101 | 11-22-33-44-55-66 | 2 | 1000 |
| | | 55-44-33-22-11-00 | 1 | 500 |

605

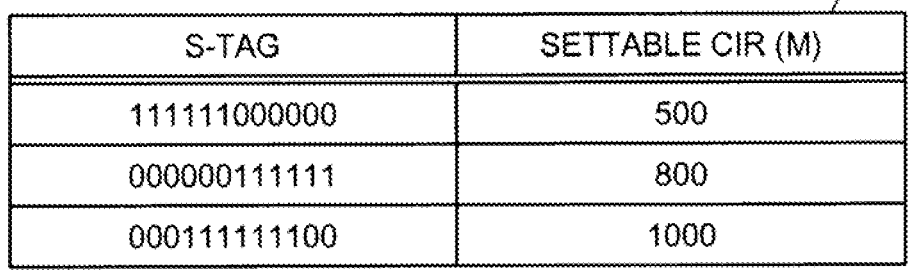
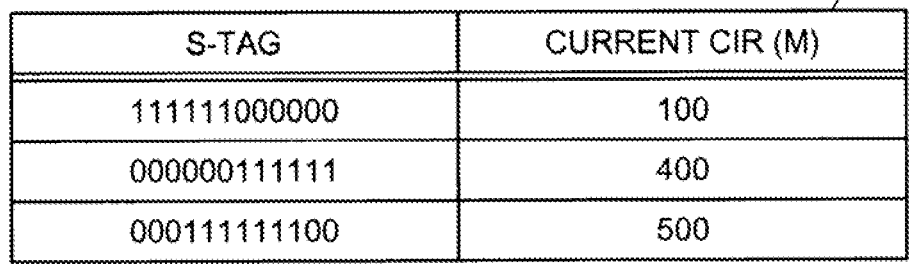

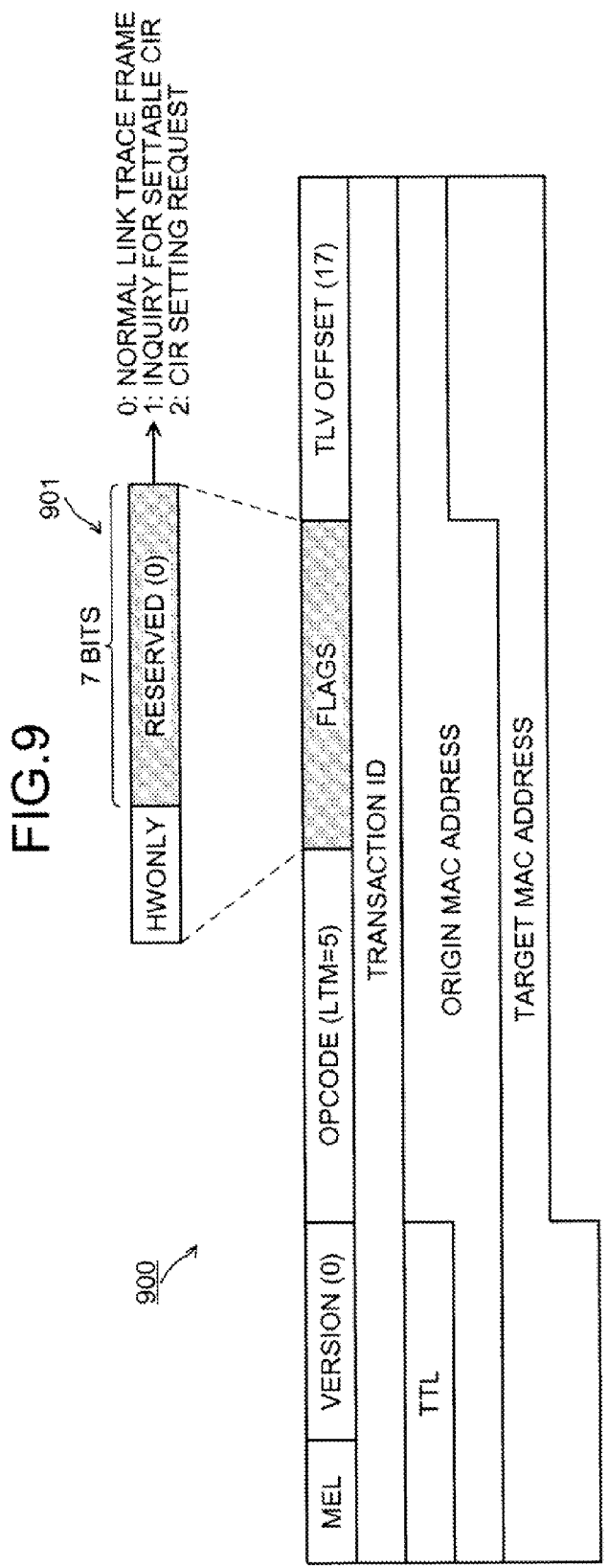

| CIR [Mbps] | CBS [KB] | EBS [Byte] |
|---|---|---|
| 10 | 50 | 100 |
| . | 50 | 100 |
| . | 50 | 100 |
| 100 | 100 | 150 |
| . | 100 | 150 |
| . | 100 | 150 |
| 1000 | 150 | 200 |
| . | 150 | 200 |
| . | 150 | 200 |

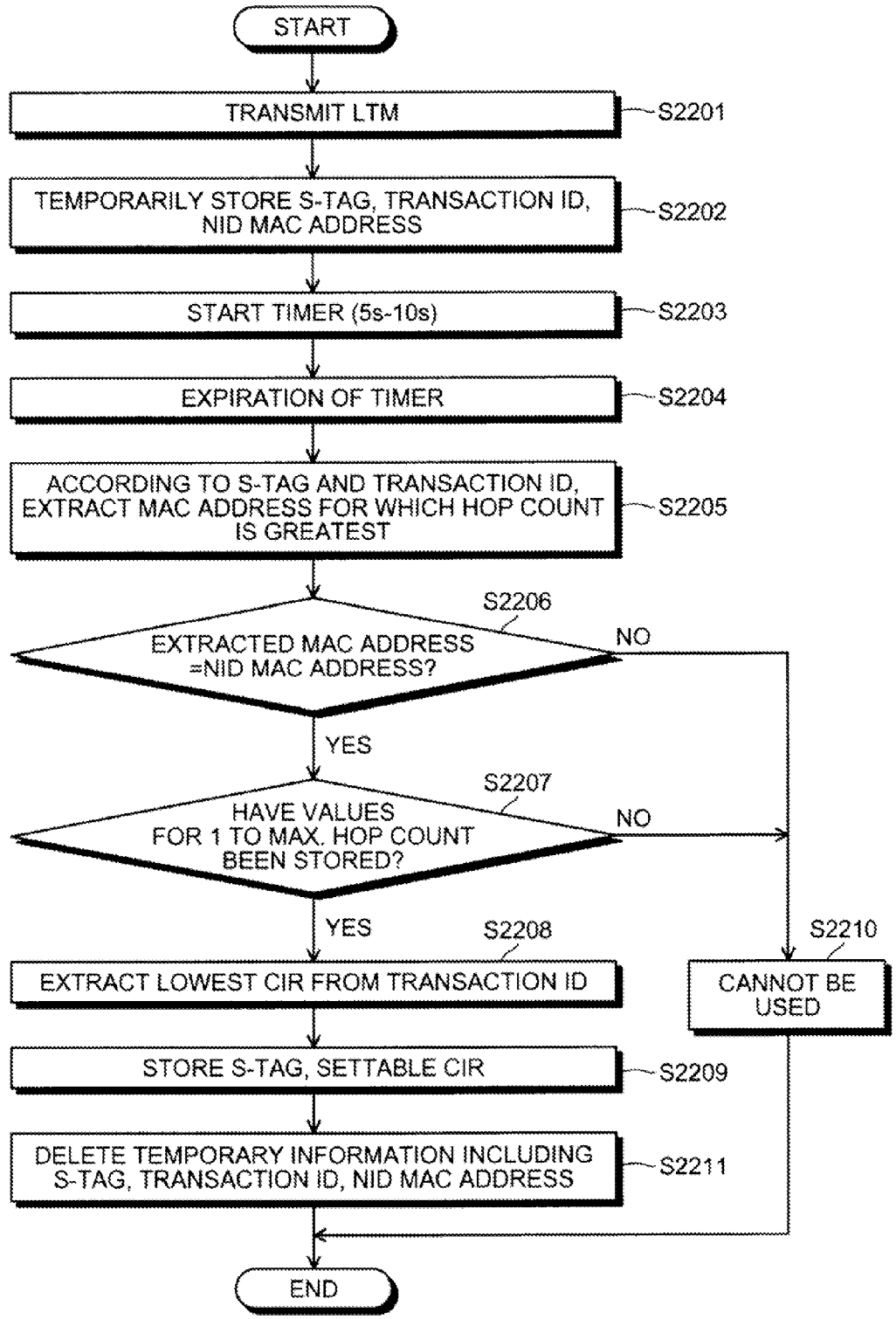

BANDWIDTH GUARANTEEING APPARATUS AND BANDWIDTH GUARANTEEING METHOD

CROSS REFERENCE TO RELATED APPLICATIONS

This application is based upon and claims the benefit of priority of the prior Japanese Patent Application No. 2011-116717, filed on May 25, 2011, the entire contents of which are incorporated herein by reference.

FIELD

The embodiments discussed herein are related to a bandwidth guaranteeing apparatus and a bandwidth guaranteeing method that guarantee bandwidth at an operator virtual connection (OVC).

BACKGROUND

Network systems have been proposed that have an element management system (EMS), which manages a group of network elements (NEs), and a network management system (NMS) encompassing multiple EMSs, where various settings of an NE in a layer 2 domain are manually performed through the EMS (see, for example, Japanese Laid-Open Patent Publication Nos. 2002-51076 and 2002-252636).

In the layer 2 network, when a given guarantee of bandwidth is performed for each VLAN, in the technology disclosed in Japanese Laid-Open Patent Publication Nos. 2002-51076 and 2002-252636, the EMS manages multiple NEs and changes the minimum guaranteed communication rate (committed information rate (CIR)). When fixed layer 2 services such as video delivery and VoIP services are performed over an established given bandwidth, VLAN path management using the current EMS is suitable.

If the guarantee of bandwidth between user points and cloud service points is considered, statically fixed guaranteed bandwidths alone may not suffice and when an application that utilizes a large number of cloud service CPUs is executed, the required communication volume temporarily increases and further when operations such as database backup or uploading arise, the required amount of bandwidth also temporarily increases.

However, with the conventional technologies, not all of the relay apparatuses on the OVC can instantaneously determine whether CIR changes are permissible. Since CIR changes cannot be reflected at all of the relay apparatuses on the OVC, even if the number of servers or bandwidths for utilization of a cloud service from a specific user point are temporarily increased, the minimum guaranteed amount of bandwidth that is necessary cannot be easily changed. As a result, consequent to a bottleneck of bandwidth, cases arise in which the utilization method of a cloud service is limited.

In a first conventional technology, configuration is such that after bandwidth is requested of a management server performing centralized management, the management server surveys the network bandwidth and secures available bandwidth; thus, much time is consumed from the time when a demand for required bandwidth arises until the bandwidth is actually secured. In a second conventional technology, configuration is such that wavelength paths are reserved. When a wavelength path is reserved, the IP address is designated and a path is reserved; consequently, points are limited to a ratio of 1:1 and the guarantee of bandwidth for paths between multiple points is not possible.

SUMMARY

According to an aspect of an embodiment, a bandwidth guaranteeing apparatus includes a controller that collects settable CIRs from a plurality of devices on an OVC between a user-side apparatus and the bandwidth guaranteeing apparatus; and a determiner that obtains the smallest value of settable CIRs collected by the controller and upon a bandwidth change request that is for the OVC and from the user-side apparatus, determines whether the bandwidth change request can be accepted, based on the obtained smallest value among settable CIRs.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a diagram of layer 2 network layer management.
FIG. 2 is a diagram of an example of application of an OVC.
FIG. 3A is a diagram of an EVC frame format.
FIG. 5 is a diagram depicting information collection concerning available bandwidth.
FIG. 6 is a diagram of a configuration of the bandwidth guaranteeing apparatus.
FIG. 7 is a sequence diagram of messaging between apparatuses and depicts messaging for 1 OVC.
FIG. 8B is a diagram depicting a settable CIR database received from each LTR originator.
FIG. 8C is a diagram depicting settable CIR management table, commonly among NEs on OVC path.
FIG. 8D is a diagram depicting the current CIR management table.
FIG. 9 is a diagram of an example of the format of a settable CIR inquiry.

FIG. 21 is a diagram depicting an example of the maximum size of token packets corresponding to CIR.

FIG. 22 is a flowchart of processing to obtain the minimum value of settable CIR.

DESCRIPTION OF EMBODIMENTS

Figure 3B:
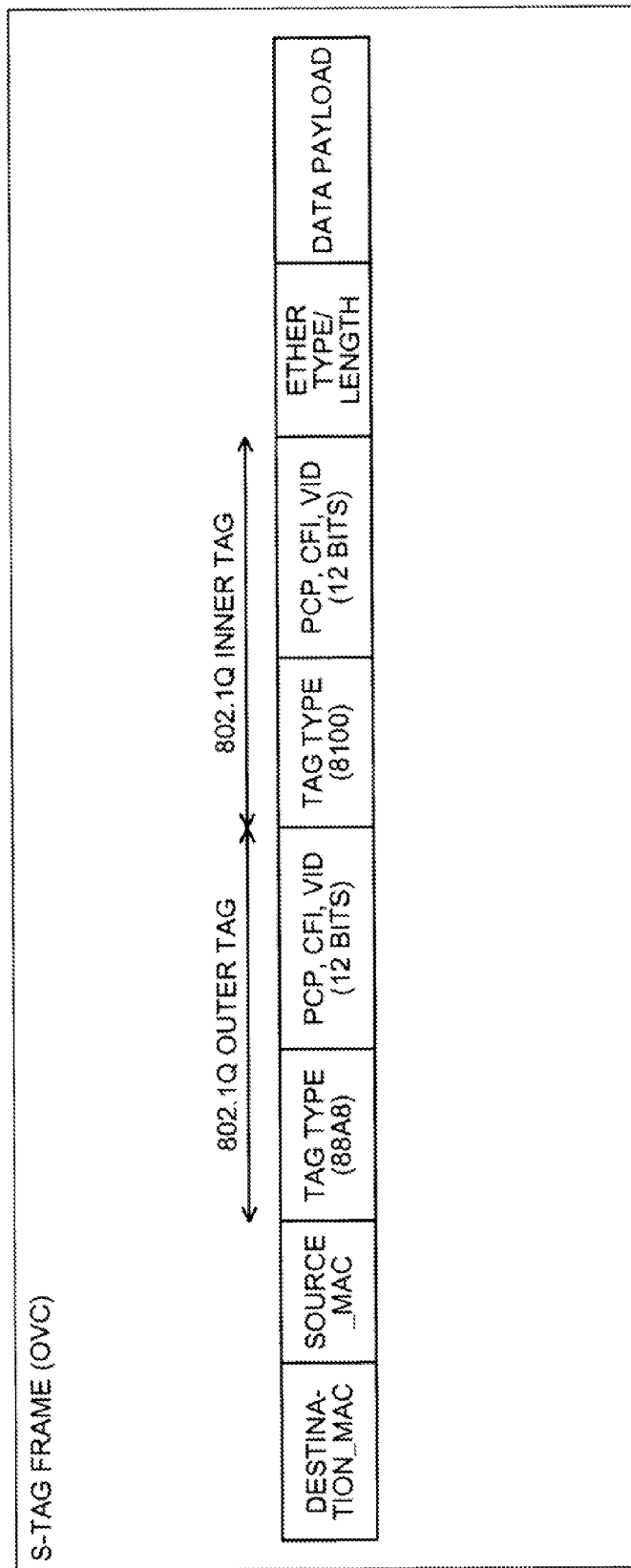
FIG. 3B is a diagram of an OVC frame format.

Preferred embodiments of the present invention will be explained with reference to the accompanying drawings. The disclosed bandwidth guaranteeing apparatus encompasses multiple VLAN tunnel paths (OVCs) between user points and periodically collects the settings of relay apparatuses on the OVCs or settable committed information rates (CIRs). By obtaining CIR settings or a settable CIR value for the OVCs, when a bandwidth change (CIR change request) is received from a user point, the bandwidth guaranteeing apparatus instantaneously, determines whether the request can be accepted and changes of CIR can be applied for the OVC. The CIR indicates for a given OVC, the guaranteed communication rate for performing a service of a constant transmission rate, even when bursts of data increases occur.

First an overview of a monitoring interval, which is a premise of the disclosed technology, will be described. FIG. 1 is a diagram of layer 2 network layer management. Layer 2 network layer management that uses operation administration and maintenance (OAM) recited in ITU-T Y.1731 "OAM functions and mechanisms for Ethernet based networks" February 2008 will be described.

In a configuration in which multiple bridges 102 are disposed on a network 100 between terminals CE 101, 101, different maintenance entity group (MEG) levels are set and error monitoring is performed for each network monitoring interval (1) to (3), which respectively differ. MEPs (indicated by "□" in the figure) are MEG end points and represent end points of monitoring intervals. MIPs (indicated by "○" in the figure) are MEG intermediate points and represent monitored intermediate points.

By using the OAM according to the technology recited in ITU-T Y.1731 "OAM functions and mechanisms for Ethernet based networks" February 2008, OAM functions can be further provided according to user, who are identified by VLAN; and thus, in a wide area layer 2 network (under Y.1731, "bridge"), stable error monitoring/management can be performed in smaller units.

FIG. 2 is a diagram of an example of application of an OVC. The sending of multiple VLAN paths (in the figure, EVC1, EVC2) from a given point, through an operator 1 network 200, to other points has an advantage of enabling easy VLAN management as compared to individual transmission in units of Ethernet virtual circuits (EVCs) and EVC management over the entire network 200 of the operator 1 by the use of a method that generates an operator virtual connection (OVC) and transmits over the OVC, which tunnels the operator 1 network 200, multiple EVCs.

FIG. 3A is a diagram of an EVC frame format. An EVC inserts an 802.1Q tag into a layer 2 frame and inserts into TAG TYPE, 8100 representing a customer VLAN tag (C-Tag). A VLAN ID is prescribed by a 12-bit VID field.

FIG. 3B is a diagram of an OVC frame format. Into the EVC frame format, an 802.1Q outer tag is inserted and into TAG TYPE, 88a8 representing a service VLAN tag (S-Tag) is inserted. The VLAN ID is prescribed by a 12-bit VID field. By prescribing an OVC, a relay apparatus on the OVC merely refers to the S-Tag, thereby simplifying layer 2 frame transfer processing.

Figure 4:
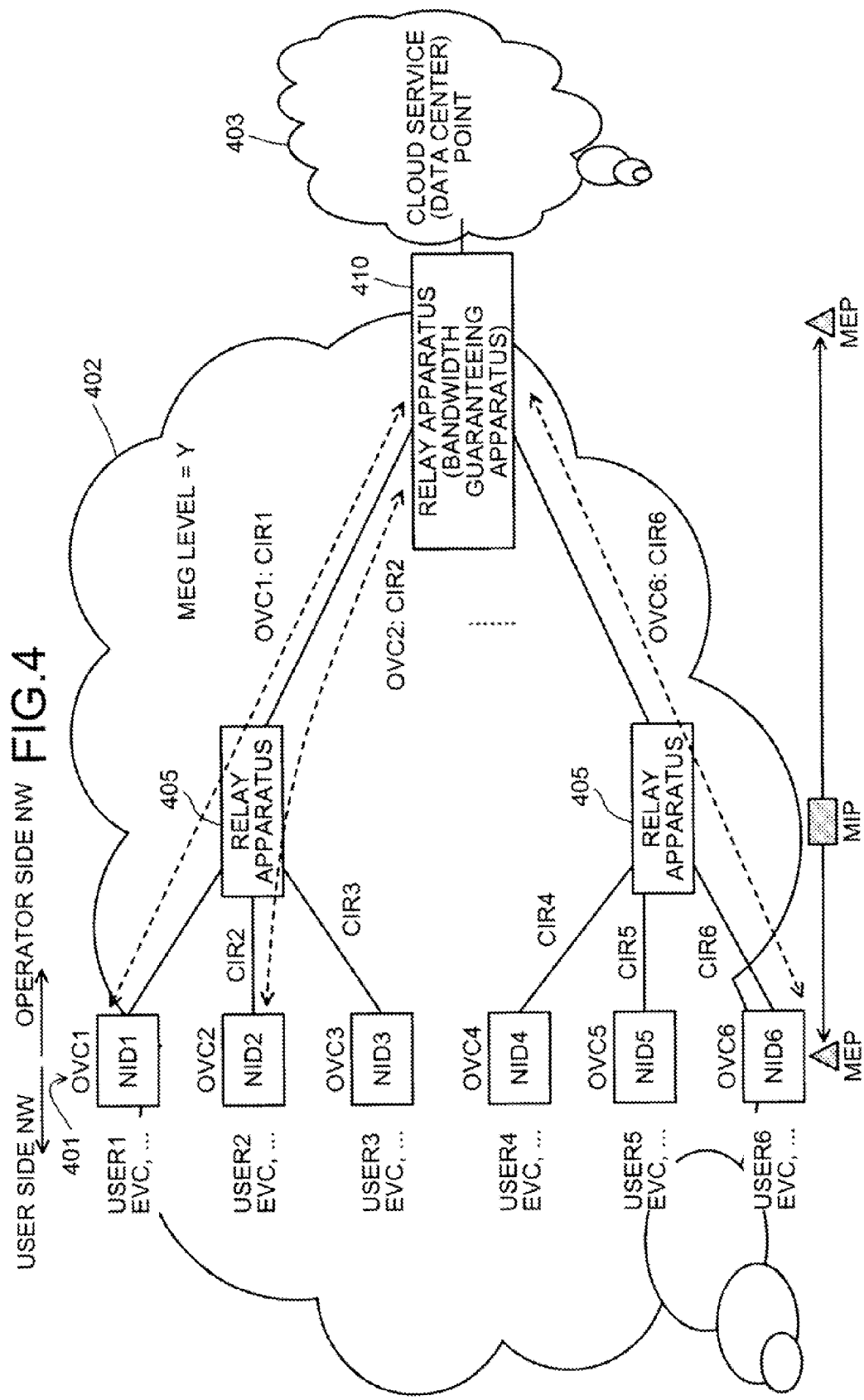
FIG. 4 is a diagram of a network configuration that includes a bandwidth guaranteeing apparatus according to an embodiment.

FIG. 4 is a diagram of a network configuration that includes the bandwidth guaranteeing apparatus according to an embodiment. Description of a configuration for a service guaranteeing bandwidth between a cloud service point (e.g., data center) and user points NID will be described. NIDs 401 disposed on the user point side represent network interface devices. The NIDs 401 function as demarcation points of the network possessed by the user and a network 402 possessed by a network operator. On paths from the NIDs 401 to a cloud service point 403, configuration includes mediating relay apparatuses 405 since a multitude of NIDs are subject to line concentration and are connected to 1 cloud service point 403.

A bandwidth guaranteeing apparatus 410 that manages CIRs assigned to the relay apparatuses 405, for each NID 401 and VLAN path (OVC) thereof, is installed at the entrance of the cloud service point 403. The bandwidth guaranteeing apparatus 410 has a function of layer 2 switching as well as a relay apparatus 405. The bandwidth guaranteeing apparatus 410 and the NIDs 401 have a function as end points of monitoring intervals (e.g., MEP function according to Y.1731 OAM). The relay apparatus 405 has a function as a monitored intermediate point (MIP function according to Y.1731), and similarly when multiple relay apparatuses 405 are present, each has a function as a monitored intermediate point. In the example depicted in FIG. 4, the NIDs 401 are MEPs; the relay apparatuses 405 are MIPs; and the bandwidth guaranteeing apparatus 410 is an MEP.

A Committed Information Rate (CIR1) is assigned to OVC1 that performed setting to the path from NID 1 to the relay apparatus 405 located at the entrance of the cloud service point 403. Similarly, a Committed Information Rate (CIR2) is assigned to OVC2 that performed setting to the path from NID 2 to the relay apparatus 405 located at the entrance of the cloud service point 403. Similarly, CIR3 to CIR6 are respectively assigned to OVC3 to OVC6 respectively corresponding to NID 3 to NID 6.

FIG. 5 is a diagram depicting information collection concerning available bandwidth for CIR. The bandwidth guaranteeing apparatus 410 periodically transmits a monitoring frame (e.g., a link trace frame according to Y.1731 OAM) to the NID 401 and the relay apparatus 405, and collects for each OVC, information indicating bandwidth available for CIR use. The bandwidth guaranteeing apparatus 410 stores, for each OVC, the smallest value among the bandwidth available for CIR use on the OVC as acquired from the NID 401 and from the relay apparatus 405. The collection of bandwidth available for CIR use, for example, is performed by an inclusion of bandwidth information into Y.1731 OAM messages.

The bandwidth guaranteeing apparatus 410, upon receiving a CIR change request from the user point, compares the CIR change request with the smallest value of bandwidth on the OVC available for CIR use and the CIR that the bandwidth guaranteeing apparatus 410 can accept, and determines whether the CIR change can be accepted. The bandwidth guaranteeing apparatus 410 includes a determiner (call admission control (CAC)) for determining whether a CIR setting change can be accepted. The CAC monitors the utilization state of a policer or shaper in the bandwidth guaranteeing apparatus 410 to make the determination. If the CIR change can be accepted, the bandwidth guaranteeing apparatus 410, by using a given communication protocol (e.g., OAM protocol according to Y.1731), causes the bandwidth guaranteeing apparatus 410 and the relay apparatus 405 to instantaneously reflect the CIR setting change.

FIG. 6 is a diagram of a configuration of the bandwidth guaranteeing apparatus. In the description hereinafter, configuration primarily for the guarantee of bandwidth will be described and description of communication control by another signaling protocol will be omitted. The bandwidth guaranteeing apparatus 410 includes a controller 601, an input/output interface 610, and a switch 630. The controller 601 can be configured by software or by hardware and executes processing related to communication and the guarantee of bandwidth. In the case of software, configuration can be such that a CPU executes a bandwidth guaranteeing program stored on a ROM, etc., uses memory such as a RAM as a work area, and performs data processing.

The controller 601 monitors the CIR of each uplink/downlink OVC and controls CIR setting, etc. The controller 601 includes a processor 602, an OAM frame transceiver 603, and management tables that the processor 602 sets and refers to. The management tables include a NID management table 604, a settable CIR database 605 where each settable CIR is received from each LTR originator, a CIR management table 606 which stores smallest value of settable CIR over OVC, and a CIR management table 607 which stores current CIR over OVC.

The processor 602 includes a determiner (CAC) 602a. The determiner 602a determines whether a change of CIR is possible, and assigns a new CIR to a scheduler (or shaper) 623 and a policer 614 of the input/output interface 610. The OAM frame transceiver 603 handles the transceiving of OAM communication frames through the input/output interface 610 and has a function of an MEP. The NID management table 604 stores therein correspondence relations of the NIDs and the OVCs. The CIR database 605 stores therein according to OVC (S-Tag), path information and the settable CIRs collected from the relay apparatus. The settable CIR management table 606 stores smallest value of settable CIRs which are received from LTR responders. The CIR management table 607 stores therein according to OVC, the current CIR, etc.

The input/output interface 610 is provided at the NID 401 side and the cloud service point 403 side, respectively. Each input/output interface 610 includes an input processor 611 and an output processor 621. The input processor 611 includes a layer 2 (L2) input frame processor 612, a classifier 613, and a policer 614. The output processor 621 includes a queuing device 622, a scheduler 623, and an L2 output frame processor 624. The switch 630, which hands over layer 2 frames, is provided between the input/output interfaces 610, 610.

FIG. 7 is a sequence diagram of messaging between apparatuses and depicts messaging for 1 OVC. The bandwidth guaranteeing apparatus 410, via the NID management table 604, manages correspondences between the MAC addresses of the NIDs 401 and the S-Tags for identifying OVCs (step S701). The bandwidth guaranteeing apparatus 410 uses a given frame (LTM frame, e.g., the Link Trace frame according to Y.1731), sets the MAC address of the NID 401 as the target MAC address and sets the MAC address of the bandwidth guaranteeing apparatus 410 as the origin MAC address, and transmits to the NID 401 and the relay apparatus 405, an inquiry frame concerning the settable CIR (step S702). This given frame is periodically transmitted for each OVC.

The NID 401 and the relay apparatus 405 refer to the origin MAC address and target MAC address information in the given frame, use a given frame, and transmit to the bandwidth guaranteeing apparatus 410, respectively, a response frame (step S703). This response frame includes a settable CIR. Consequently, the bandwidth guaranteeing apparatus 410 stores the latest information concerning the settable CIR for each OVC (step S704).

When the NID 401 changes the CIR, the NID 401 uses a given frame (e.g., a vender specific message (VSM) frame described hereinafter) and makes a CIR change request to the bandwidth guaranteeing apparatus 410 (step S705). Consequently, the bandwidth guaranteeing apparatus 410 determines whether a CIR change is possible (step S706), and if the CIR can be changed, changes the CIR for the OVC (step S707). When changing the CIR, the bandwidth guaranteeing apparatus 410 uses a given frame and transmits to the NID 401, a CIR setting request that includes the value to which the CIR is to be changed (step S708).

The NID 401 and the relay apparatus 405, in response to the CIR setting request by the given frame, change the CIR for the OVC (step S709), use a given frame, and respectively transmit to the bandwidth guaranteeing apparatus 410, a response frame indicating completion of the CIR setting (step S710). The bandwidth guaranteeing apparatus 410 uses a given frame and transmits to the OVC, notification of completion of CIR changing (step S711).

Subsequently, when there is a CIR change request from a user, a VSM frame that includes an S-Tag from the NID 401 is transmitted to the bandwidth guaranteeing apparatus 410. For example, a trigger for transmission of the VSM frame is when the user accesses the NID 401 via a Web interface and performs CIR change operations.

Figure 8A:
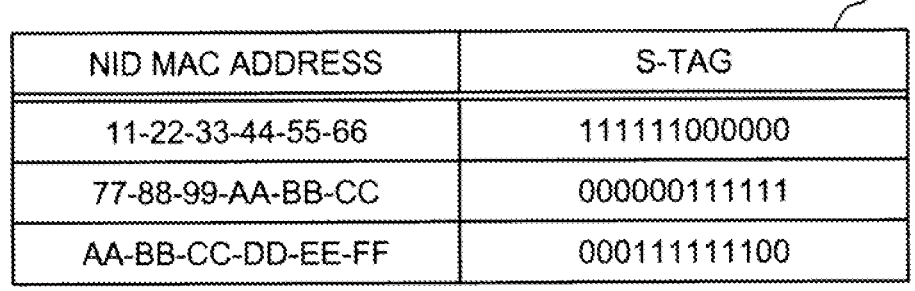
FIG. 8A is a diagram depicting an NID management table.

FIGS. 8A to 8D are diagrams depicting the contents of management tables of the bandwidth guaranteeing apparatus. FIG. 8A is a diagram depicting the NID management table. The NID management table 604 correlates the NID 401 MAC addresses and the S-Tags identifying the OVCs FIG. 8B is a diagram depicting the CIR database. The CIR database 605 includes S-Tags identifying the OVCs, transaction IDs, the MAC addresses of the relay apparatuses 405, the hop counts from the bandwidth guaranteeing apparatus 410, and settable CIRs. Consequently, by identifying the same frame (a link trace response (LTR) frame corresponding to an LTM frame) by the transaction ID, responses from apparatuses (NID 401, the relay apparatus 405) corresponding to the OVC can be correlated.

The LTR frame copies the transaction ID of the LTM frame and is returned. Further, concerning the hop count from the bandwidth guaranteeing apparatus 410, a given area (e.g., TTL(255)) in the transmitted LTM frame and the TTL (consequent to subtraction) of the returned LTR frame are compared, whereby the layer 2 hop count from the bandwidth guaranteeing apparatus 410 can be stored to the CIR database 605. Old information may be deleted periodically from the CIR database 605.

FIG. 8C is a diagram depicting the CIR management table which stores settable CIR over OVC. The processor 602 refers to the CIR database 605 and sets the CIR management table 606, which stores the smallest value from settable CIRs and is a result of the processor 602 extracting settable CIRs having the same transaction number and storing the lowest CIR among the extracted settable CIRs.

FIG. 8D is a diagram depicting the CIR management table. The CIR management table 607 stores therein according to OVC (S-Tag), the current CIR.

FIG. 9 is a diagram of an example of the format of a CIR inquiry. FIG. 9 depicts an example of a given frame (LTM frame) transmitted by the bandwidth guaranteeing apparatus 410. In an LTM frame 900, an unused area (a reserved 7-bit flags field) 901 is used and an inquiry concerning the settable CIR is made to the NID 401 and the relay apparatus 405. The reserved values ( ) of the flags field 901 are assumed to be 0: normal link trace frame; 1: settable CIR inquiry; and 2: CIR setting request.

The LTM frame above is stored to the data payloads of the EVC and OVC depicted in FIG. 3A and FIG. 3B and width is transmitted. The data payload is not limited to storing an LTM frame and may similarly store an LTR frame, a VSM frame, a vender specific response (VSR) frame, etc. The S-tag for identifying OVCs is stored to the 12-bit VID field in the 802.1Q outer tag depicted in FIG. 3B. The relay apparatus 405 and the NID 401 receive an LTM frame that is from the bandwidth guaranteeing apparatus 410 and in the IEEE802.1ad frame format. By identifying the S-Tag, the relay apparatus 405 and the NID 401 can identify information of the OVC for which the inquiry is made.

Similarly, for LTR frames, VSM frames, and VSR frames, communication using the IEEE802.1ad frame format is performed, whereby information of the OVC can be identified by the VID in the S-Tag. The origin MAC address (Source MAC) of the LTM is the MAC address of the bandwidth guaranteeing apparatus 410 and the destination MAC address (Destination MAC) is a multicast address.

The destination MAC address of the LTM frame is assumed to be a multicast address (e.g., under Service OAM according to Y.1731, Multicast Class 2 DA:01-80-C2-00-00: 3x:x indicates MEG Level) and an MIP that has received the LTM frame is assumed to perform reception via the OAM frame transceiver 603. At the relay apparatus 405, only when the MEG Level of the received LTM frame coincides with the MEG Level belonging to the relay apparatus 405 and the target MAC address of the received LTM frame coincides with the NID 401 MAC address stored in the database of the relay apparatus 405, does the relay apparatus 405 insert the LTM transaction ID and the TTL of the LTM less 1 into an LTR frame and transmit the LTR frame to the origin MAC Address in the LTM.

Figure 10:
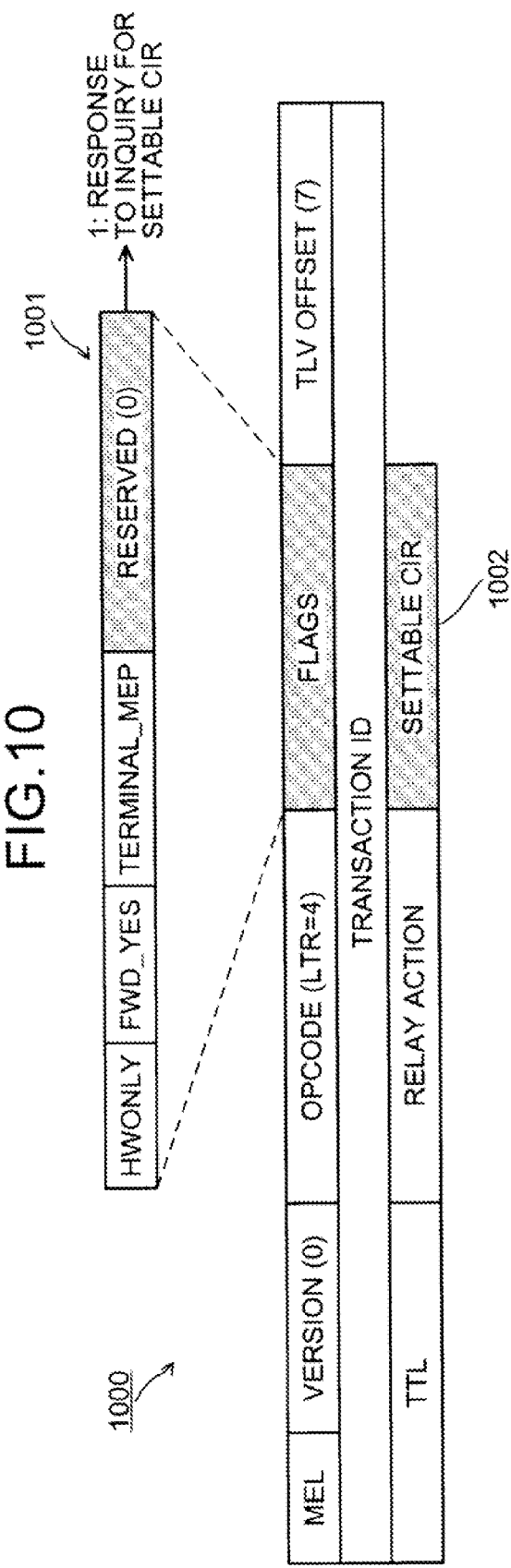
FIG. 10 is a diagram of an example of the format of notification of settable CIR.

FIG. 10 is a diagram of an example of the format of notification of the settable CIR. FIG. 10 depicts an example of a given frame (LTR frame) transmitted by the NID 401 and the relay apparatus 405. In an LTR frame 1000, an unused area (a reserved flags field) 1001 is used and by setting the reserved value in a flags field 1001 to 1, the given frame is indicated to be a response to the settable CIR inquiry. Newly, an 8-bit TLV field 1002 is used, the settable CIR is inserted and the frame is transmitted. At the bandwidth guaranteeing apparatus 410, this LTR frame is periodically received from the relay apparatus 405 and the NID 401 on the OVC, whereby the latest settable CIR can be obtained.

Figure 11:
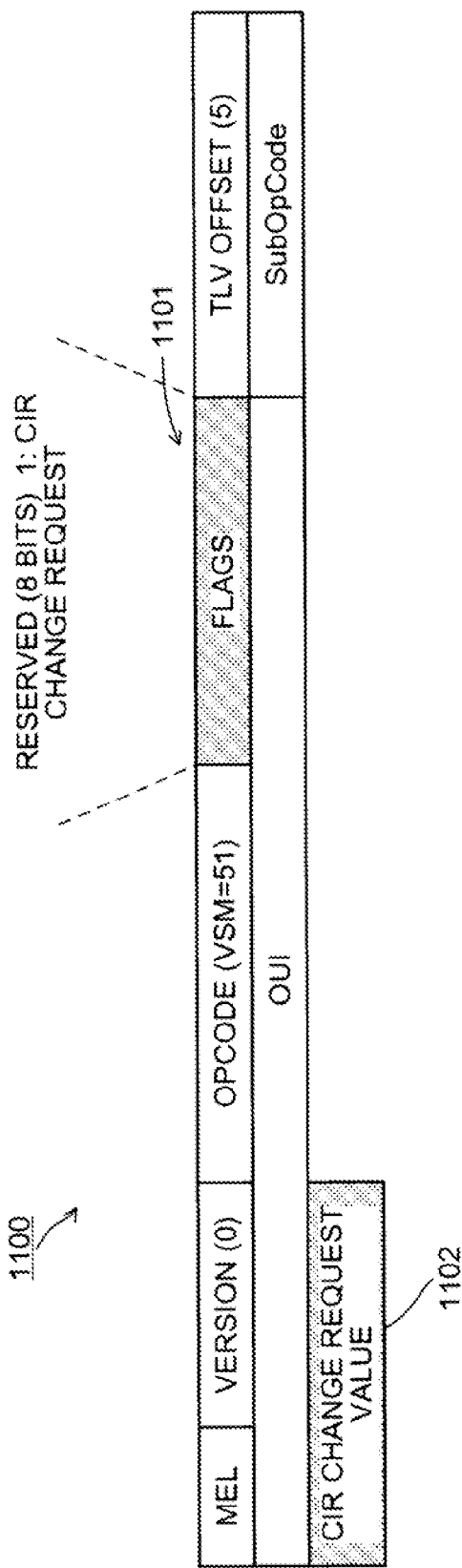
FIG. 11 is a diagram of an example of the format of a CIR change request.

FIG. 11 is a diagram of an example of the format of a CIR change request. FIG. 11 depicts an example of a given frame (VSM frame) transmitted by the NID 401. When the changing of the CIR is requested, the reserved value in a flags field 1101 of a VSM frame 1100 is set to 1, indicating the VSM frame 1100 to be a CIR change request. Further, in a TLV field 1102, a CIR change request value is set. The bandwidth guaranteeing apparatus 410 that receives this VSM frame determines whether the CIR change is possible, and if so, uses an LTM frame to make a CIR setting request to the relay apparatus 405 and the NID 401.

Figure 12:
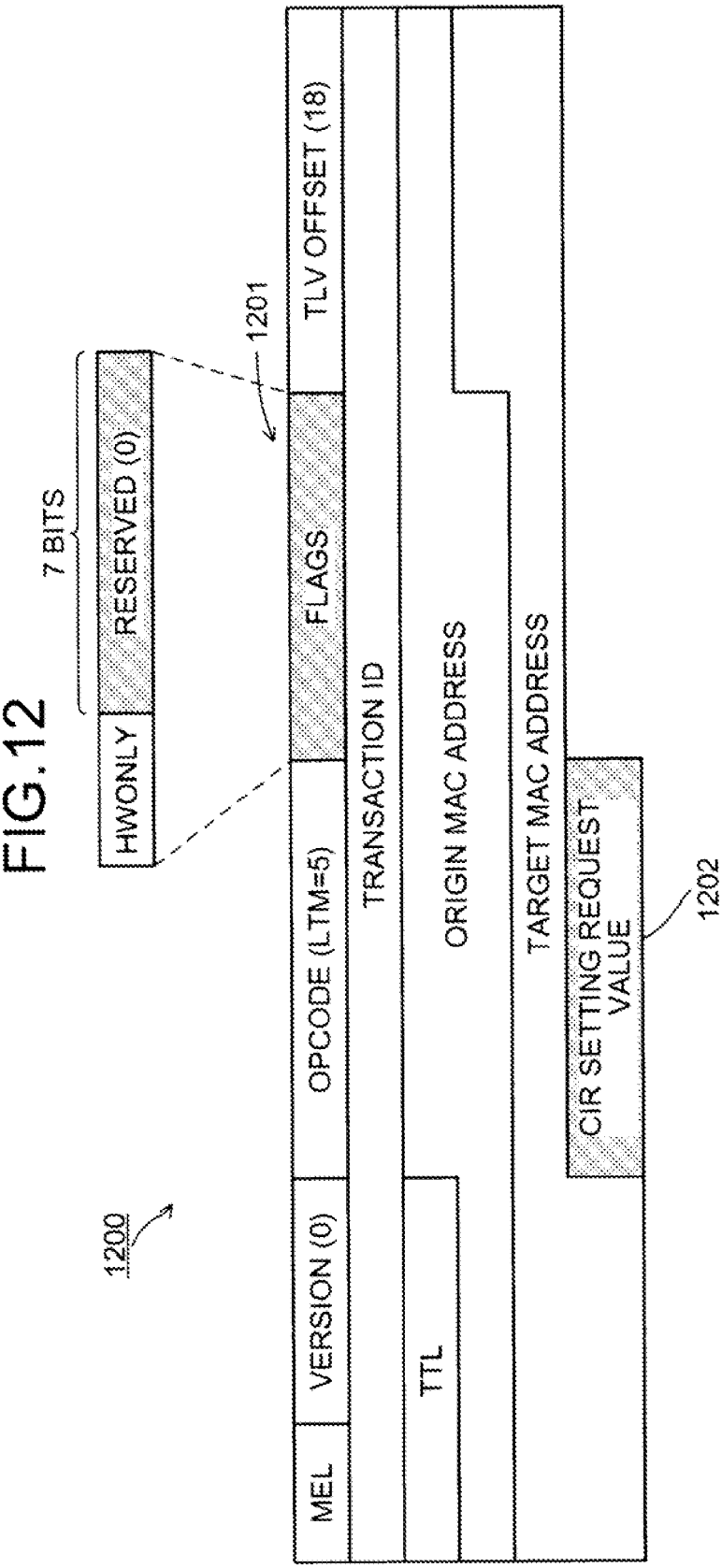
FIG. 12 is a diagram of an example of the format of a CIR setting request.

FIG. 12 is a diagram of an example of the format of a CIR setting request. FIG. 12 depicts a given frame (LTM frame) transmitted by the bandwidth guaranteeing apparatus 410. This frame is identical to the LTM frame depicted in FIG. 9. When a CIR setting request is made, the reserved value of a flags field 1201 in an LTM frame 1200 is set to 2, indicating the LTM frame 1200 to be a CIR setting request. Further, in a TLV field 1202, a CIR setting request is set and the frame is transmitted. The CIR setting request value may be the communication rate (Mbps) requested to be set, a given value (e.g., 10M, 20M, . . . , 100M, etc.) in a template prepared in advance, etc.

Figure 13:
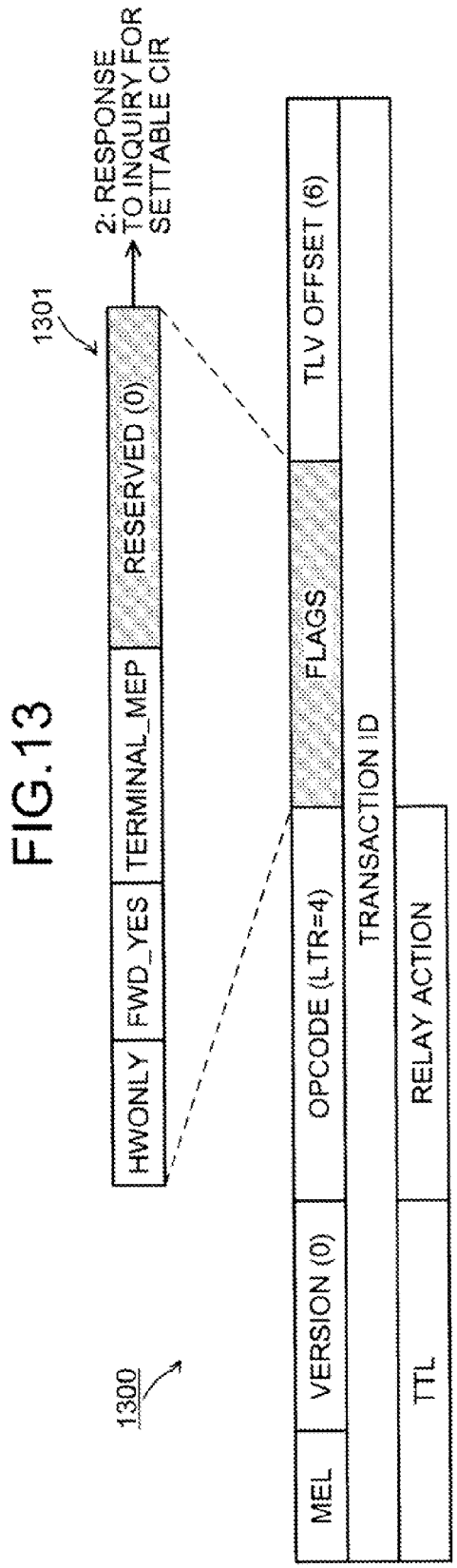
FIG. 13 is a diagram of an example of the format of a response to a CIR setting request.

FIG. 13 is a diagram of an example of the format of a response to a CIR setting request. As depicted, for example, the reserved value in a flags field 1301 in an LTR frame 1300 is set to 2 indicating the LTR frame 1300 to be a response to a settable CIR inquiry and the LTR frame 1300 is transmitted.

Figure 14:
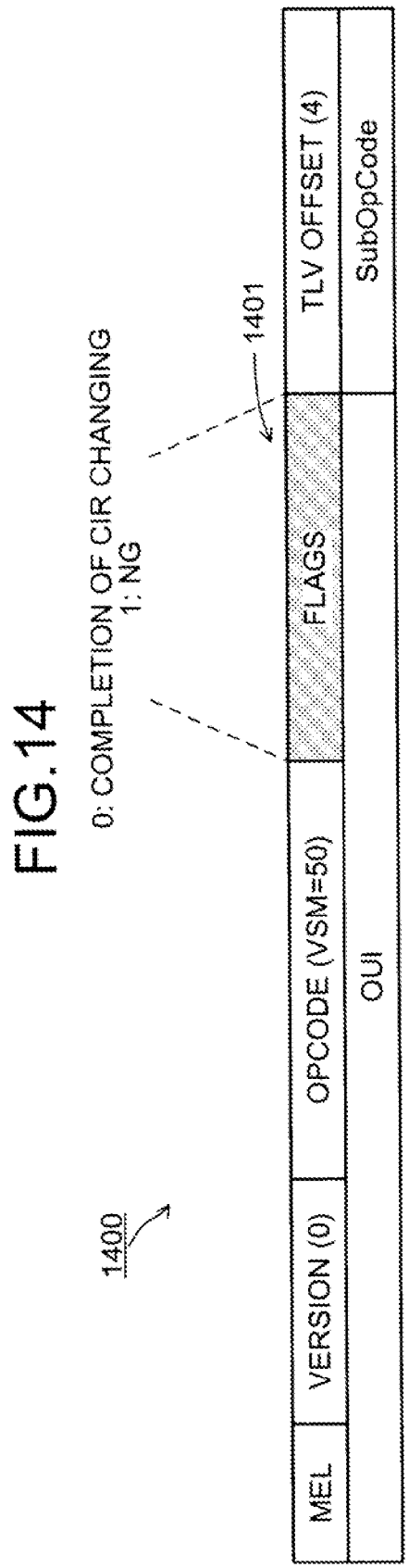
FIG. 14 is a diagram of example of the format of a response to a CIR change request.

FIG. 14 is a diagram of example of the format of a response to a CIR change request. As depicted, for example, a flags field 1401 in a VSR frame 1400 is used and a value indicating CIR completion (0) or a value indicating NG (1) is set, and the VSR frame 1400 is transmitted to the bandwidth guaranteeing apparatus 410. Since the bandwidth guaranteeing apparatus 410 has already inquired about the settable bandwidth, a response of NG does not usually arise.

Configurations of the relay apparatus 405 and the NID 401 are basically identical to the configuration of the bandwidth guaranteeing apparatus 410, and description thereof will be omitted. The relay apparatus 405 uses management tables and according to OVC, stores the current guaranteed bandwidths for the CIR. Similarly, the NID 401 stores according to OVC, the current guaranteed bandwidths for the CIR.

Figure 15:
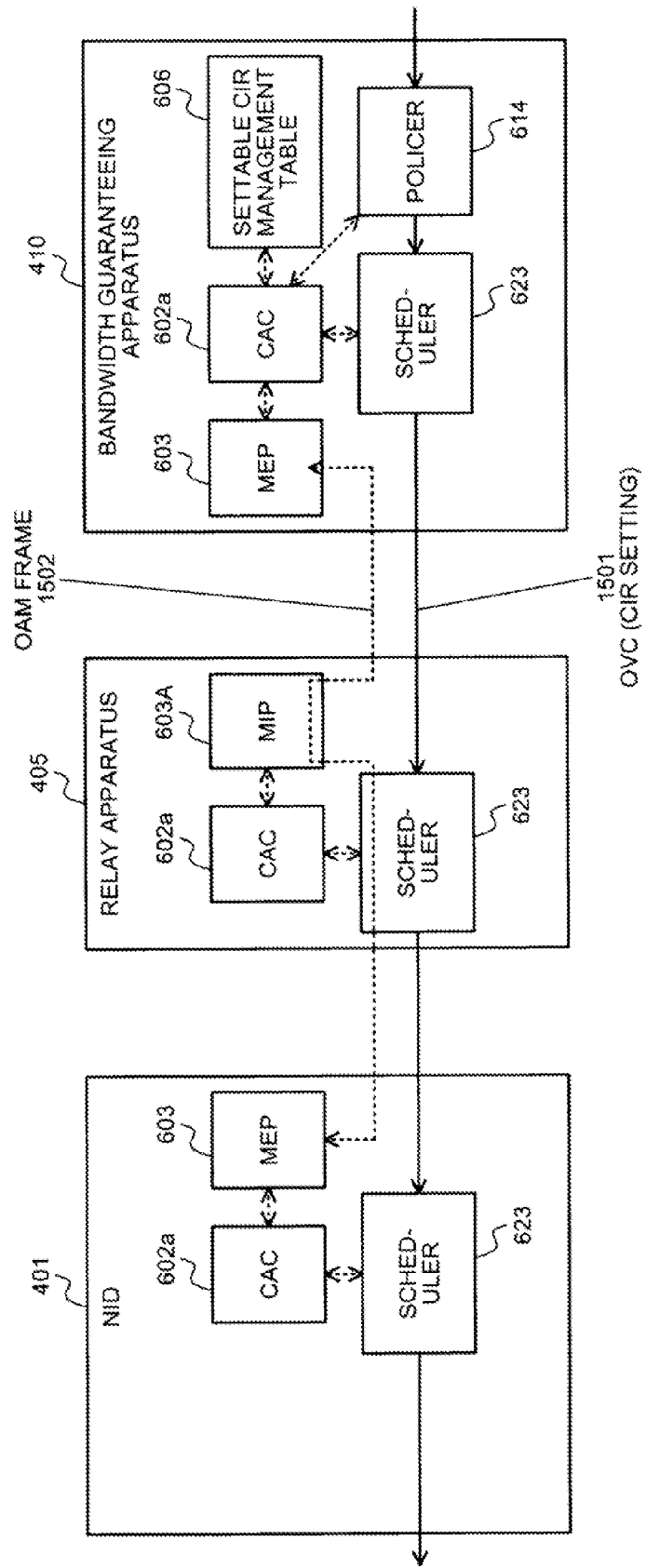
FIG. 15 is a diagram depicting communication related to the guarantee of bandwidth concerning downlink communication.

FIG. 15 is a diagram depicting communication related to the guarantee of bandwidth concerning downlink communication. FIG. 15 depicts an overview of operations between apparatuses in a direction of cloud service point→NID. Details such as databases, tables, etc. of the apparatuses are not depicted.

The bandwidth guaranteeing apparatus 410, via the determiner (CAC) 602a and from information from the scheduler 623, the policer 614 and the minimum CIR management table 606, determines whether a CIR change with respect to an OVC 1501 is possible. If the CIR change is possible, the bandwidth guaranteeing apparatus 410 reflects CIR change information at the scheduler 623 and the policer 614. The OAM frame transceiver 603 has an MEP function and via an OAM frame 1502, communicates information for bandwidth control between the relay apparatus 405 and the NID 401.

The relay apparatus 405, via the OAM frame transceiver 603 having an MIP function (603A in the figure), relays the OAM frame 1502. Similarly, the relay apparatus 405 has the determiner (CAC) 602a and causes reflection of the setting at the scheduler 623. The NID 401, via the OAM frame transceiver 603 having an MEP function, receives and transmits the OAM frame 1502. Furthermore, the NID 401 has the determiner (CAC) 602a and causes reflection of the setting at the scheduler 623.

Figure 16:
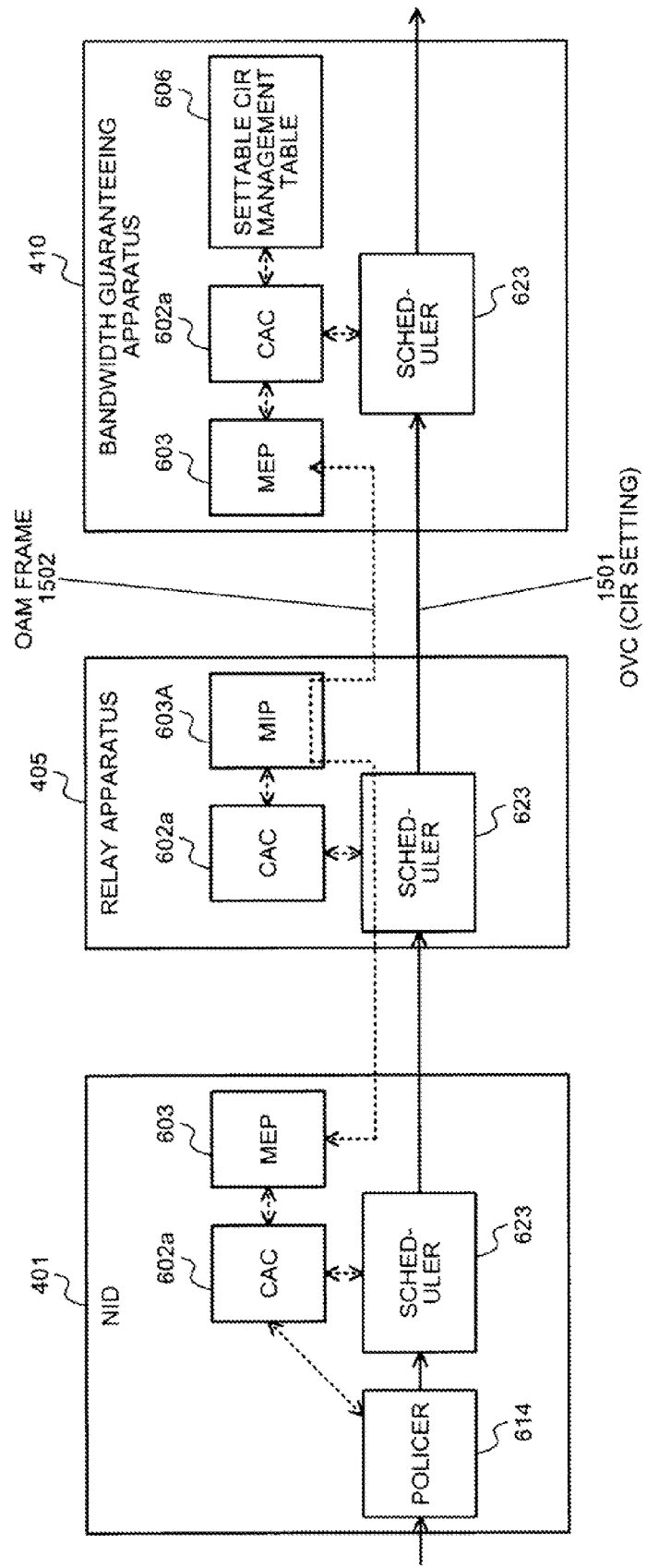
FIG. 16 is a diagram depicting communication related to the guarantee of bandwidth concerning uplink communication.

FIG. 16 is a diagram depicting communication related to the guarantee of bandwidth concerning uplink communication. FIG. 15 depicts an overview of operations between apparatuses in a direction of NID-cloud service point. One dissimilarity with respect to FIG. 15 is that the policer 614 is disposed at the upstream edge on the transmission path and controls the transmission volume at the entrance (upstream) of the transmission direction.

The NID 401, via the OAM frame transceiver 603 having an MEP function, receives and transmits the OAM frame 1502. The NID 401 further has the determiner (CAC) 602a and causes the setting to be reflected at the scheduler 623 and the policer 614. The relay apparatus 405, via the OAM frame transceiver 603 having an MIP function (603A in the figure), relays the OAM frame 1502. Similarly, the relay apparatus 405 has the determiner (CAC) 602a and causes reflection of the setting at the scheduler 623.

The bandwidth guaranteeing apparatus 410 has the determiner (CAC) 602a and from information that is from the scheduler 623 and the minimum CIR management table 606, determines whether the CIR change for the OVC 1501 is possible. The bandwidth guaranteeing apparatus 410 further reflects CIR change information at the scheduler 623. The OAM frame transceiver 603 has an MEP function and via the OAM frame 1502, exchanges with the relay apparatus 405 and the NID 401, information that is for bandwidth control.

The configurations depicted in FIGS. 15 and 16 are configurations in which the policer 614 function of controlling the ingress traffic to the layer 2 network is provided in the bandwidth guaranteeing apparatus 410 and the NID 401, respectively, but not in the relay apparatus 405. Thus, the policer 614 is disposed only at the network edge portion, enabling simplification of administration and management related to traffic control. When network configuration is complicated such as when traffic from other networks flows directly to the relay apparatus 405, the policer 614 function may be provided in all of the apparatuses, i.e., not just at the edge of the OVC.

Figure 17:
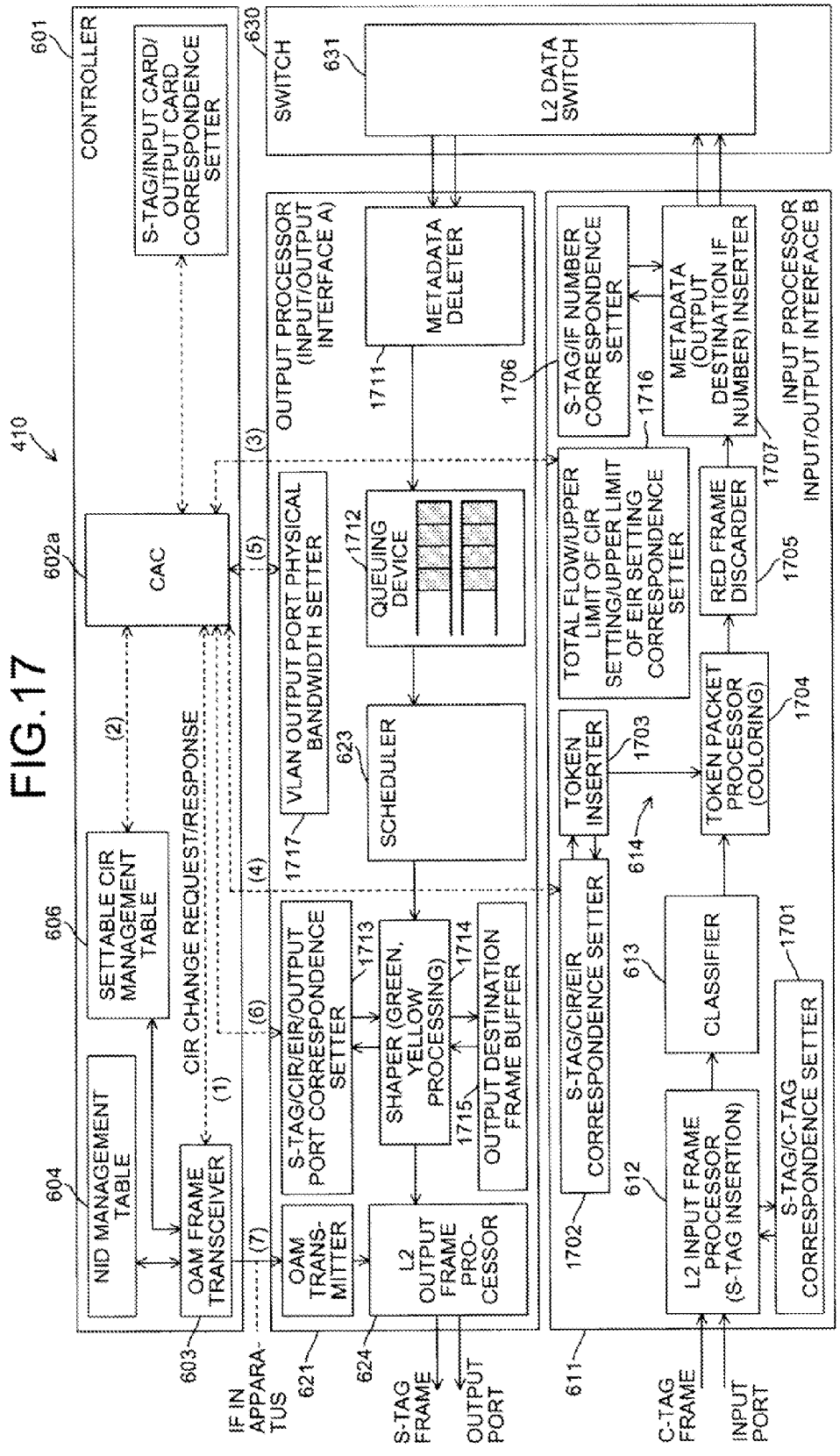
FIG. 17 is a diagram of downlink communication processing at the bandwidth guaranteeing apparatus.

FIG. 17 is a diagram of downlink communication processing at the bandwidth guaranteeing apparatus. Processing by each component of the bandwidth guaranteeing apparatus 410 for downlink communication in the direction of the cloud service point 403→the NID 401 will be described.

(Input Processor 611 of Input/Output Interface B)

Consequent to a setting of an S-Tag/C-Tag correspondence setter 1701, the S-Tag depicted in FIG. 3B is appended to the C-Tag frame (FIG. 3A) input to the L2 input frame processor 612. The policer 614 operates by a token packet scheme and periodically inserts, from a token inserter 1703, a token corresponding to a setting of an S-Tag/CIR/excess information rate (EIR) correspondence setter 1702. Next, the policer 614, via a token packet processor 1704, performs frame coloring (coloring); via a red frame discarder 1705, discards red frames; and transfers green frames and yellow frames to an output interface A.

The frame transfer to the output interface A is performed by an inclusion of an output destination interface number by a metadata inserter 1707, which includes the output destination interface number according to the setting of an S-Tag/IF number correspondence setter 1706. The switch 630 refers to the output destination interface number of the transfer frame and via an L2 data switch 631, transfers the transfer frame to the output destination interface A.

(Output Processor 621 of Input/Output Interface A)

Metadata is deleted from the received data by a metadata deleter 1711 and according to rules of each VLAN, etc., the data is queued by a queuing device 1712. The scheduler 623 determines the sequence in which the queued data is read and sequentially reads the data. Based on a setting of an S-Tag/CIR/EIR output port correspondence setter 1713, bandwidth is controlled by a shaper 1747, and the data is transmitted from an output port at a constant rate by the L2 output frame processor 624. For burst input, after the data is stored to an output destination frame buffer 1715, the data is output at a constant rate.

(Controller 601)

(1) The determiner (CAC) 602a determines whether a CIR change requested via the OAM frame transceiver 603 can be accepted. (2) The CAC 602a compares the CIR change request value received by the OAM frame transceiver 603 and the minimum CIR stored in the minimum CIR management table 606, and if the minimum CIR is greater, transitions to the next determination.

(3) Next, the CAC 602a compares the resources on the policer 614 side. At the input interface B, the CAC 602a manages the insertion rate of tokens that can be assigned to the card overall and within a range that the tokens can be assigned, permits CIR changes. The management of insertion rate for the entire card is performed based on the setting of a total flow/upper limit of CIR setting/upper limit of EIR setting correspondence setter 1716. (4) The CAC 602a, upon permitting token insertion at the policer 614, determines whether the CIR change at a shaper 1714 of the output interface A can be accepted. At the shaper 1714, the management of output port correspondence is performed by the S-Tag/CIR/EIR correspondence setter 1702.

(5) The CAC 602a refers to the value set by a VLAN output port physical bandwidth setter 1717, for the CIR related to the bandwidth change at a shaper 1714 and determines whether the total CIR for the S-Tag group output from the output port exceeds the output rate. (6) If the total CIR is less than or equal to the output port rate, the CAC 602a, among values set by an S-Tag/CIR/EIR/output port correspondence setter 1713, changes the CIR of the concerned S-Tag. (7) The CAC 602a outputs the frame from the L2 output frame processor 624, at the newly changed CIR.

Figure 18:
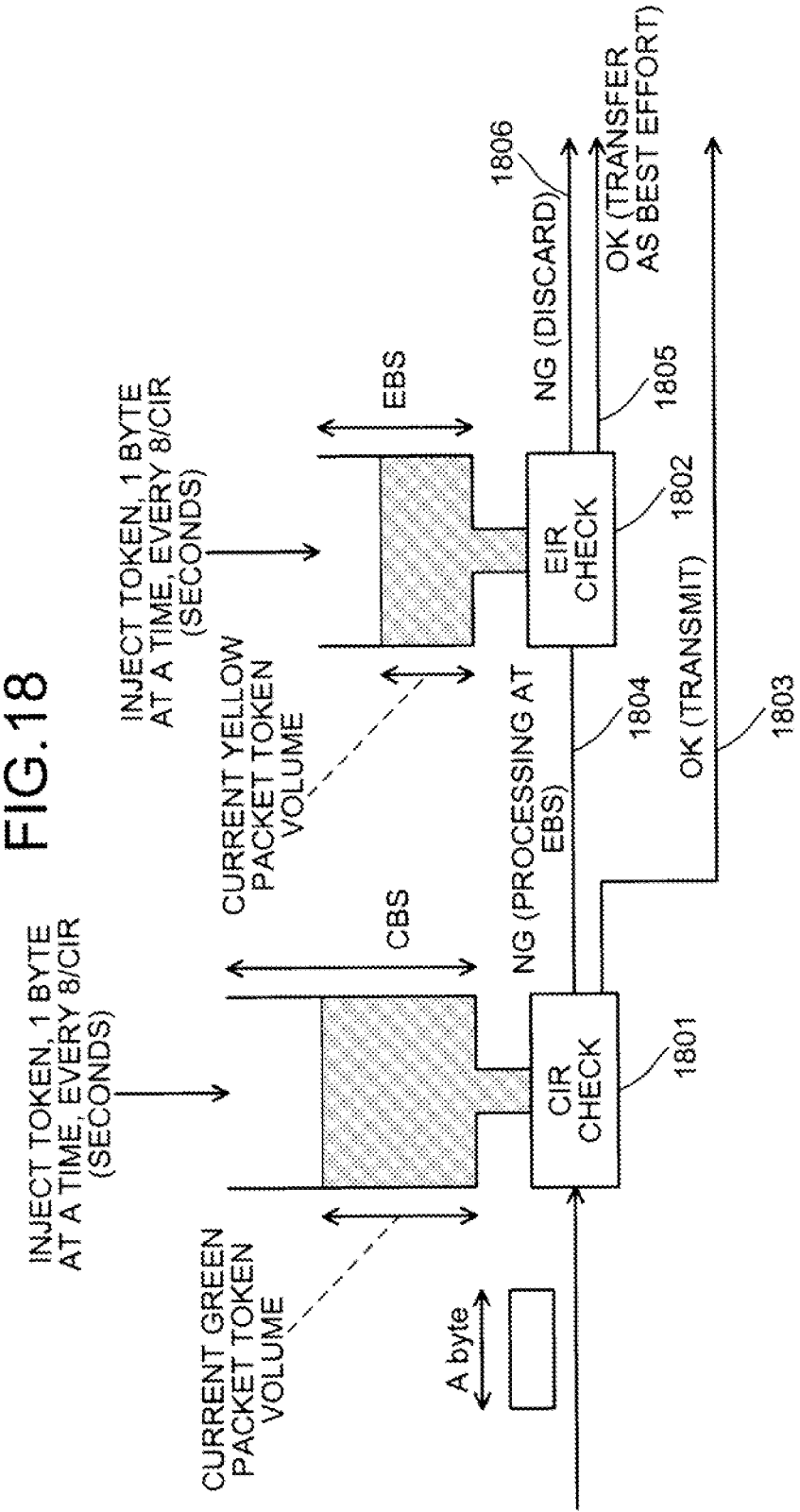
FIG. 18 is a diagram of token insertion to a policer.

FIG. 18 is a diagram of token insertion to the policer. At the policer 614, according to OVC and concerning token packets, there are 2 packets, the respective maximum sizes (permissible burst sizes) of which are prescribed by CBS and EBS respectively, and the upper limit of ingress frames is set according to the burst size. Further, a CIR setting rate check 1801 and an EIR setting rate check 1802 are respectively performed, and tokens corresponding to these rates are periodically inserted into the CBS and EBS packets. When a frame 1803 is transferred, the frame size is subtracted from the packet. Although an input frame 1804 that has exceeded CBS is output as a frame 1805 after being sent to EBS, a frame 1806 that has exceeded EBS is discarded.

Figure 19:
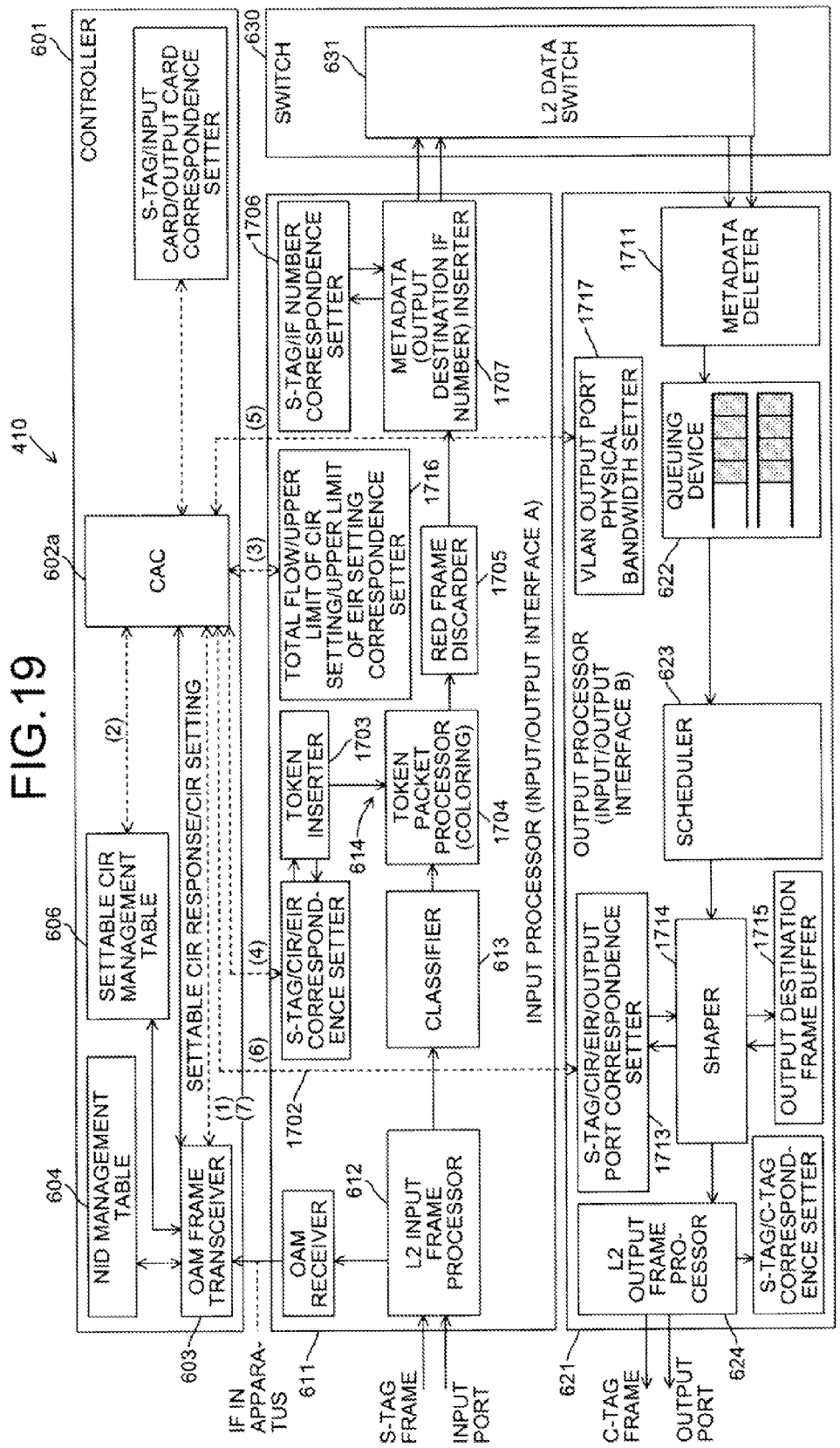
FIG. 19 is a diagram of uplink communication processing at the bandwidth guaranteeing apparatus.

FIG. 19 is a diagram of uplink communication processing at the bandwidth guaranteeing apparatus. Processing by each component of the bandwidth guaranteeing apparatus 410 for uplink communication in the direction of the NID 401→the cloud service point 403 will be described. Components identical to those depicted in FIG. 17 are given the same reference numerals used in FIG. 17 and description thereof is omitted.

(Input Processor 611 of Input/Output Interface A)

Transfer to the output interface B is performed concerning an S-Tag input to the L2 input frame processor 612. Frame transfer to the output interface B is performed by an insertion of metadata into the S-Tag, the metadata including an output destination interface number. The switch 630 refers to the output destination interface number and performs transfer to the output destination interface B.

(Output Processor 621 of Input/Output Interface B)

Metadata is deleted from the received data and according to rules of each VLAN, etc., the data is queued. The scheduler determines the sequence in which the queued data is read and sequentially reads the data. Based on CIR and EIR information set for the S-Tag, the data is transmitted from the output port at a constant rate. For burst input, after the data is stored to an output destination frame buffer, the data is output at a constant rate.

(Controller 601)

(1) The determiner (CAC) 602a determines whether a CIR change requested via the OAM frame transceiver 603 can be accepted. (2) The CAC 602a compares the CIR change request value received via the OAM frame transceiver 603 and, the CIR or the variable minimum settable value stored in the minimum CIR management table 606; and if the minimum CIR is greater, transitions to the next determination.

(3) Next, the CAC 602a compares the resources on the policer 614 side. At the input interface B, the CAC 602a manages the insertion rate of tokens that can be assigned to the card overall and within a range that the tokens can be assigned, permits CIR changes. The management of insertion rate for the entire card is performed based on the setting of a total flow/upper limit of CIR setting/upper limit of EIR setting correspondence setter 1716. (4) The CAC 602a, upon permitting token insertion at the policer 614, determines whether the CIR change at a shaper 1714 of the output interface A can be accepted. At the shaper 1714, the management of output port correspondence is performed by the S-Tag/CIR/EIR correspondence setter 1702.

(5) The CAC 602a refers to the value set by a VLAN output port physical bandwidth setter 1717, for the CIR related to the bandwidth change at a shaper 1714 and determines whether the total CIR for the S-Tag group output from the output port exceeds the output rate. (6) If the total CIR is less than or equal to the output port rate, the CAC 602a, among values set by an S-Tag/CIR/EIR/output port correspondence setter 1713, changes the CIR of the concerned S-Tag. (7) The CAC 602a outputs the frame from the L2 output frame processor 624, at the newly changed CIR.

Figure 20:
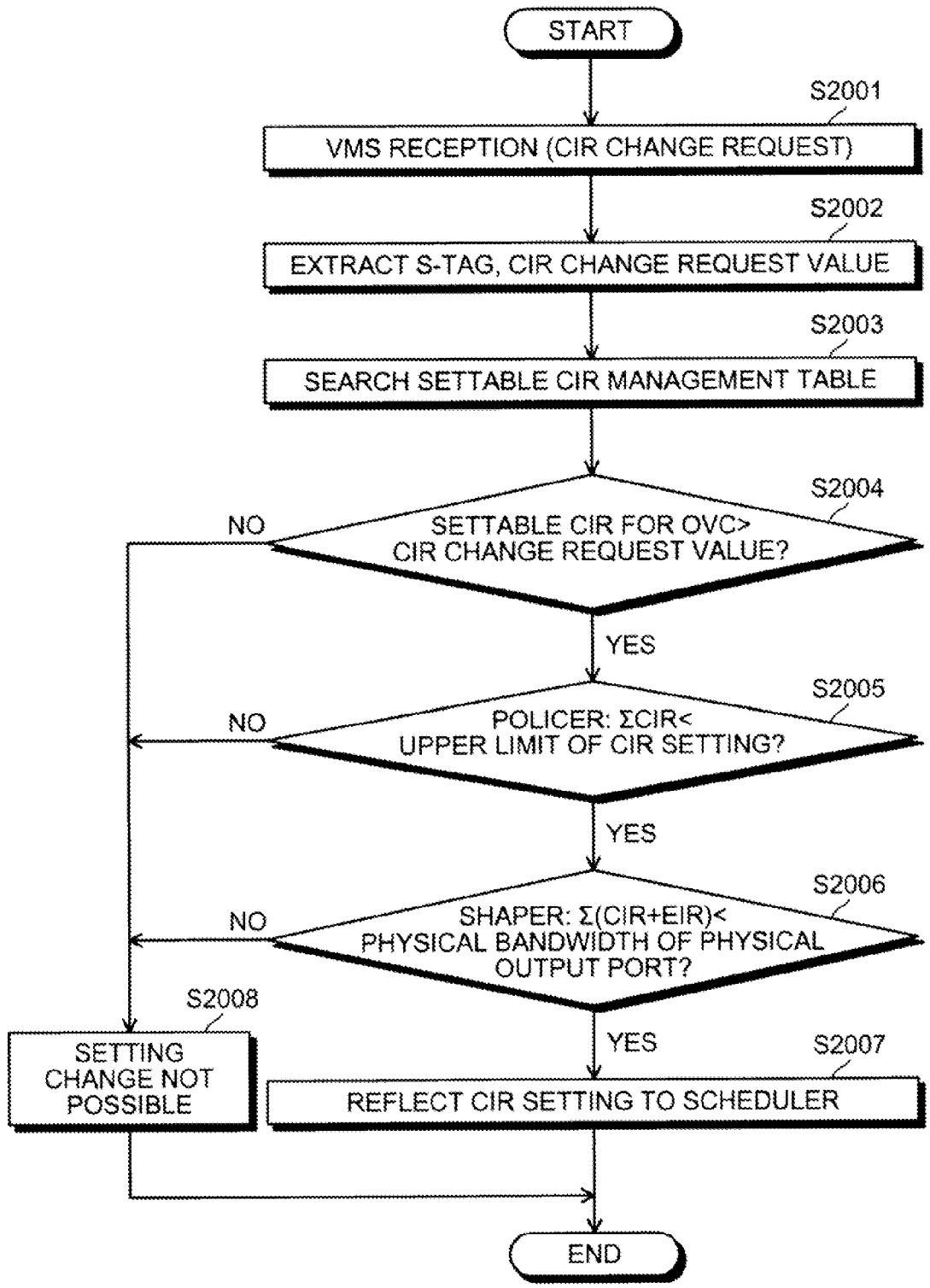
FIG. 20 is a flowchart of processing by a determiner of the bandwidth guaranteeing apparatus.

FIG. 20 is a flowchart of processing by the determiner of the bandwidth guaranteeing apparatus. When the bandwidth guaranteeing apparatus 410 receives from the NID 401, a VSM frame that includes a CIR change request (step S2001), the CAC 602a extracts the S-Tag and the CIR change request value from the VSM frame (step S2002). Next, the CAC 602a searches the minimum CIR management table 606 and obtains the minimum CIR for the S-Tag (concerned OVC) (step S2003).

The CAC 602a determines whether CIR change request value is less than the minimum CIR (step S2004). If the CIR change request value is less than the minimum CIR (step S2004: YES), the CAC 602a transitions to step S2005; and if the CIR change request value is greater than or equal to the minimum CIR (step S2004: NO), the CAC 602a transitions to step S2008.

At step S2005, the CAC 602a determines whether ΣCIR is less than the upper limit of the CIR setting. ΣCIR is calculated from the CIR change request value and the current CIR stored according to OVC in the CIR management table 607. ΣCIR includes the CIR change request amount. The upper limit of the CIR setting is managed by the policer 614 as described above. If ΣCIR is less than the upper limit of the CIR setting (step S2005: YES), the CAC 602a transitions to step S2006; and if ΣCIR is greater than or equal to the upper limit of the CIR setting (step S2005: NO), the CAC 602a transitions to step S2008.

At step S2006, the CAC 602a determines whether Σ(CIR+EIR) is less than the physical output port physical bandwidth. Σ(CIR+EIR) is managed by the shaper 1714. Here, ΣCIR may be used to make the determination. In this case, the EIR bandwidth is temporarily decreased, enabling preference to be given to CIR. If Σ(CIR+EIR) is less than the physical output port physical bandwidth (step S2006: YES), the CAC 602a transitions to step S2007; and if Σ(CIR+EIR) is greater than or equal to the physical output port physical bandwidth (step S2006: NO), the CAC 602a transitions to step S2008.

At step S2007, the CAC 602a reflects the CIR to the scheduler 623, and the processing ends. At step S2008, if the CAC 602a determines the setting to be impossible, the processing ends.

FIG. 21 is a diagram depicting an example of the maximum size of token packets corresponding to CIR. The maximum size CBS, EBS of the token packets described above can be preliminarily retained as a template 2100 of values corresponding to CIRs. The policer 614 changes CBS, EBS according to changes of the CIR.

Further, the bandwidth guaranteeing apparatus 410 can use the TLV field in the LTM frame (see FIG. 9) and similar to the case of the CIR, can notify the relay apparatus 405 and the NID 401 on the same OVC, of the values set for CBS and EBS in conjunction with performing processing for changing the CIR.

FIG. 22 is a flowchart of processing to obtain the minimum CIR. Processing primarily executed by the determiner (CAC) 602a of the controller 601 will be described. First, an LTM frame is transmitted to the OVC (step S2201) and the S-Tag, the transaction ID, and the NID MAC address are temporarily stored (step S2202). The MAC address of the NID 401 is extracted from the target MAC address of the LTM. A timer is initiated (step S2203). The timer, for example, is set for a given interval of 5 to 10 seconds.

The CAC 602a, each time the given interval timed by the timer elapses (step S2204), extracts from the CIR database 605, the MAC address for which the hop count is greatest for the S-Tag and the transaction ID (step S2205). The CAC 602a determines whether the extracted MAC address is the NID MAC address (step S2206). Here, the NID MAC address is compared to a MAC address extracted from the NID management table 604. If the MAC address is the MAC address of the NID 401 (step S2206: YES), the CAC 602a transitions to step S2207; and if the MAC address is not the MAC address of the NID 401 (step S2206: NO), the CAC 602a transitions to S2210.

At step S2207, the CAC 602a determines whether values for hop counts from 1 to the maximum hop count have been stored. The CAC 602a determines whether information for all devices on the same OVC has been acquired. If all of the values have been stored (step S2207: YES), the CAC 602a refers to the CIR database 605, acquires for a single transaction ID, the settable (changeable) CIR for each of the relay apparatuses and from among the acquired CIRs, extracts the smallest CIR (step S2208). The CAC 602a stores to the minimum CIR management table 606, the S-Tag and, CIR setting or the minimum settable value (step S2209), and transitions to step S211.

On the other hand, at step S2207, if all of the value have not been stored (step S2207: NO), the CAC 602a transitions to step S2210. At step S2210, since utilization is not possible, the processing ends. Alternatively, the CAC 602a may delete the entry of the concerned S-Tag from the minimum CIR management table 606 and transition to step S2211. In the case of a new S-Tag, since no record exists, deletion is not performed.

At step S2211, temporary information including the S-Tag, transaction ID, and the NID MAC address are deleted, ending the processing.

In the embodiment above, although a configuration of changing the CIR with respect to 1 OVC is described, the CIR can be similarly changed with respect to multiple OVCs, thereby enabling efficient use of bandwidth between multiple user points.

The bandwidth guaranteeing apparatus uses CIR information and has a configuration of periodically communicating with the NID and the relay apparatus in advance to obtain the minimum settable CIR. Consequently, upon a CIR change request from a user point (NID), the bandwidth guaranteeing apparatus can instantaneously make a determination concerning the requested CIR change. As a result, in a short period of time, the bandwidth guaranteeing apparatus can respond to a request for a bandwidth change from the user point, thereby enabling the bandwidth to be changed immediately without any wait.

The bandwidth guaranteeing apparatus determines whether a bandwidth change is possible, uses a given communication protocol, performs CIR changes with respect to NIDs and relay apparatuses on the OVC, and executes CIR changes by a simple configuration and in a short period of time. Further, irrespective of the number of NIDs and relay apparatuses on the OVC, the bandwidth guaranteeing apparatus can efficiently and instantaneously change bandwidth. In particular, since the bandwidth guaranteeing apparatus uses layer 2 MAC addresses and VLAN tag information to manage devices on the OVC, the transmission efficiency of communication can be improved and processing can be simplified.

When the guarantee of bandwidth described above is applied to a service where charges are based on bandwidth usage, lines to a cloud service can be implemented by effective bandwidth utilization, thereby enabling profit increases for the network operator providing the service. For example, unused bandwidth that arises can be distributed among multiple OVCs.

The disclosed bandwidth guaranteeing apparatus and bandwidth guaranteeing method enable responses to bandwidth change requests and bandwidth changes to be performed quickly.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A bandwidth guaranteeing apparatus comprising:
a controller that collects information indicating bandwidth available for committed information rate for a plurality of devices on an OVC between a user-side apparatus and the bandwidth guaranteeing apparatus; and
a determiner that obtains the smallest value of the information indicating bandwidth available for committed information rate collected by the controller and upon a bandwidth change request that is for the OVC and from the user-side apparatus, determines whether the bandwidth change request can be accepted, based on the obtained guaranteed information indicating bandwidth available for committed information rate, wherein
the controller sets addresses of a transmission origin and transmission destination in a given communication frame; periodically requests the devices on the OVC for the information indicating bandwidth available for committed information rates; and based on the addresses, correlates and stores to a storage device in an updatable manner, the devices and the information indicating bandwidth available for committed information rate in communication frame responses from the devices.

2. The bandwidth guaranteeing apparatus according to claim 1, wherein
the determiner sets the smallest value of the information indicating bandwidth available for committed information rate in a unit controlling communication rate, when the bandwidth change request can be accepted.

3. The bandwidth guaranteeing apparatus according to claim 2, wherein
the determiner requests the devices for a change of the information indicating bandwidth available for committed information rate, when the bandwidth change request can be accepted.

4. The bandwidth guaranteeing apparatus according to claim 2, wherein
the unit that controls the communication rate is a policer, and
the determiner determines whether the bandwidth change request can be accepted, based on whether tokens equivalent to the bandwidth change can be allocated from surplus tokens managed by the policer.

5. The bandwidth guaranteeing apparatus according to claim 4, wherein
the policer preliminarily stores token packet sizes that correspond to the rate at the time of the bandwidth change and sets the token packet size that corresponds to the bandwidth after the bandwidth has been changed.

6. The bandwidth guaranteeing apparatus according to claim 2, wherein
the unit controlling the communication rate is a shaper, and
the determiner determines whether the bandwidth change request can be accepted, based on whether the sum of the bandwidth change requests that are for a plurality of OVCs and set for a communication port managed by the shaper exceeds a physical bandwidth of the communication port.

7. The bandwidth guaranteeing apparatus according to claim 1, wherein
the controller uses a given communication frame to request the devices on the OVC to change the information indicating bandwidth available for committed information rate respectively corresponding to the devices and receives a response.

8. The bandwidth guaranteeing apparatus according to claim 7, wherein
the controller uses an unused region of the communication frame, and transmits requests, responses, and a value to be set.

9. The bandwidth guaranteeing apparatus according to claim 1, wherein
the controller uses an unused region of the communication frame, and transmits requests, responses, and a value to be set.

10. The bandwidth guaranteeing apparatus according to claim 1, wherein
the controller collects the information indicating bandwidth available for committed information rates included in given frames that are received from the devices and have the same transaction ID.

11. A bandwidth guaranteeing method comprising:
collecting information indicating bandwidth available for committed information rate for a plurality of devices on an OVC between a user-side apparatus and the bandwidth guaranteeing apparatus; and
determining upon a bandwidth change request that is for the OVC and from the user-side apparatus, whether the bandwidth change request can be accepted, based on an information indicating bandwidth available for committed information rate that has the smallest value of information indicating bandwidth available for committed information rate among network elements, wherein collecting comprises setting addresses of a transmission origin and transmission destination in a given communication frame, periodically requesting the devices on the OVC for the information indicating bandwidth available for committed information rates, and based on the addresses, correlating and storing to a storage device in an updatable manner, the devices and the information indicating bandwidth available for committed information rate in communication frame responses from the devices.

\* \* \* \* \*